US012389159B2

(12) United States Patent
Vilkamo et al.

(10) Patent No.: US 12,389,159 B2
(45) Date of Patent: Aug. 12, 2025

(54) SUPPRESSING SPATIAL NOISE IN MULTI-MICROPHONE DEVICES

(71) Applicant: Nokia Technologies Oy, Espoo (FI)

(72) Inventors: Juha Vilkamo, Helsinki (FI); Mikko-Ville Laitinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 348 days.

(21) Appl. No.: 18/012,543

(22) PCT Filed: Jun. 3, 2021

(86) PCT No.: PCT/FI2021/050409

§ 371 (c)(1),
(2) Date: Dec. 22, 2022

(87) PCT Pub. No.: WO2021/260260

PCT Pub. Date: Dec. 30, 2021

(65) Prior Publication Data

US 2023/0319469 A1 Oct. 5, 2023

(30) Foreign Application Priority Data

Jun. 24, 2020 (GB) ..................................... 2009645

(51) Int. Cl.
*H04R 3/00* (2006.01)
*H04R 3/04* (2006.01)
(Continued)

(52) U.S. Cl.
CPC .............. *H04R 3/005* (2013.01); *H04R 3/04* (2013.01); *H04R 5/027* (2013.01); *H04S 7/30* (2013.01);
(Continued)

(58) Field of Classification Search
None
See application file for complete search history.

(56) References Cited

U.S. PATENT DOCUMENTS 8,744,101 B1 * 6/2014 Burns .................. H04R 25/407 381/313
10,117,019 B2 * 10/2018 Elko .................. G10L 21/0264
(Continued)

OTHER PUBLICATIONS

Mirabilii, D. et al., "Spatial Coherence-Aware Multi-Channel Wind Noise Reduction," IEEE/ACM Transactions on Audio, Speech, and Language Processing, vol. 28, 2020.
(Continued)

*Primary Examiner* — Paul W Huber
(74) *Attorney, Agent, or Firm* — McCarter & English LLP

(57) ABSTRACT

An apparatus including circuitry configured to: obtain at least two microphone audio signals; determine audio data including different directivity configurations that are able to capture sound from substantially a same or similar direction; determine at least one value related to the sound arriving from at least the same or similar direction based on the audio data; determine further audio data including at least one configuration which provides a more omnidirectional directivity configuration than the audio data; determine at least one value related to the sound based on the further audio data; and determine a noise suppression parameter based on the at least one value related to the arriving sound and the value related to the sound. The spatial noise suppression parameter is configured to be applied to the microphone audio signals in the generation of a playback audio signal.

22 Claims, 20 Drawing Sheets

(51) Int. Cl.
*H04R 5/027* (2006.01)
*H04S 7/00* (2006.01)

(52) U.S. Cl.
CPC .... *H04R 2201/401* (2013.01); *H04R 2410/01* (2013.01); *H04R 2410/07* (2013.01); *H04R 2430/01* (2013.01); *H04S 2400/15* (2013.01)

(56) References Cited

U.S. PATENT DOCUMENTS

| | | | | |
|---|---|---|---|---|
| 10,412,507 | B2 * | 9/2019 | Fischer | H04R 25/453 |
| 10,820,097 | B2 * | 10/2020 | Tsingos | H04R 3/005 |
| 11,282,485 | B2 * | 3/2022 | Vilkamo | G10L 19/008 |
| 2015/0304766 | A1 | 10/2015 | Delikaris-Manias et al. | |
| 2015/0379990 | A1 * | 12/2015 | Nongpiur | G10L 25/78<br>704/231 |
| 2018/0033447 | A1 | 2/2018 | Ramprashad et al. | |
| 2019/0132674 | A1 * | 5/2019 | Vilkamo | G10L 25/18 |

OTHER PUBLICATIONS

Vorobyov, S. "Principles of minimum variance robust adaptive beamforming design," Signal Processing.

Nokia Corporation, "Description of the IVAS MASA C Reference Software," 3GPP TSG-SA4#106 meeting, Tdoc S4 (19)1167, Oct. 21-25, 2019, Busan, Republic of Korea.

* cited by examiner

SUPPRESSING SPATIAL NOISE IN MULTI-MICROPHONE DEVICES

CROSS REFERENCE TO RELATED APPLICATION

This patent application is a U.S. National Stage application of International Patent Application Number PCT/FI2021/050409 filed Jun. 3, 2021, which is hereby incorporated by reference in its entirety, and claims priority to GB 2009645.9 filed Jun. 24, 2020.

FIELD

The present application relates to apparatus and methods for spatial noise suppression, but not exclusively for spatial noise suppression in mobile devices.

BACKGROUND

Mobile devices such as phones have become increasingly well-equipped capture devices with high-quality cameras, multiple microphones and high processing capabilities. The use of multiple microphones and high processing capabilities enables the capture and processing of audio signals to produce high quality audio signals which can be presented to users.

Examples of using multiple microphones on mobile devices include capturing binaural or multi-channel surround or Ambisonic spatial sound using parametric spatial audio capture. Parametric spatial audio capture is based on estimating spatial sound parameters (i.e., spatial metadata) in frequency bands based on analysis of the microphone signals and using these parameters and the microphone audio signals to render the spatial audio output.

Examples of such parameters include direction of arriving sound in frequency bands, and a parameter indicating how directional or non-directional the sound is. Other examples of multi-microphone processing include wind-noise processing that avoids using those microphone signals which are corrupted by noise, and beamforming which combines the microphone signals to generate spatial beams that emphasize desired directions at the captured sound.

The audio scene being captured by the mobile device may comprise audio sources and ambient sounds which are not desired. The suppression of such, for example, spatial noise (e.g., traffic noise and/or outdoor ambience noise) and interfering sounds (e.g., interfering speech at certain direction) from the captured audio signals is a key field of study.

In microphone-array capture, or in multi-sensor capture in general, separating sounds or signals in particular directions in presence of noise has been researched. In order to achieve this some known methods include beamforming, where multiple microphone signals are combined using complex-valued beamforming weights (where the weights are different in different frequencies) to generate a beamformed signal. The weights can be static or adaptive. One example of static beamforming is a delay-sum beamformer, which provides a high signal-to-noise ratio with respect to microphone noise. One example method in adaptive beamforming is the minimum-variance distortionless response (MVDR) beamformer, which optimizes the beamforming weights based on the measured microphone array signal covariance matrix so that, as the result, the total energy of the output beamformed signal is minimized while the sounds from the look direction are preserved.

Another known method for separating sounds or signals in particular directions in presence of noise is post-filtering, where adaptive gains are applied in frequency bands to further suppress the noise or interferers at the beamformed signal. For example, at low frequencies, the beamformers typically have limited capabilities to generate directional beams due to the long wavelength of the acoustic wave in comparison to the physical dimensions of the microphone array, and a post-filter could be implemented to further suppress the interfering energy. A post-filter could be designed for example based on the estimated spatial metadata, so that when it is estimated that a sound is arriving from another direction than the look direction (at a frequency band), then the sound is suppressed with a gain factor at that frequency band.

SUMMARY

There is provided according to a first aspect an apparatus comprising means configured to: obtain at least two microphone audio signals; determine audio data comprising different directivity configurations that are able to capture sound from substantially a same or similar direction; determine at least one value related to the sound arriving from at least the same or similar direction based on the audio data; determine further audio data comprising at least one configuration which provides a more omnidirectional directivity configuration than the audio data; determine at least one value related to the sound based on the further audio data; and determine at least one noise suppression parameter based on the at least one value related to the sound arriving from the same or similar direction and the at least one value related to the sound, wherein the at least one spatial noise suppression parameter is configured to be applied to the at least two microphone audio signals in the generation of at least one playback audio signal.

The means configured to determine audio data comprising different directivity configurations that are able to capture sound from substantially a same or similar direction may be configured to determine at least one first audio signal combination or selection from the at least two microphone audio signals and at least one second audio signal combination or selection from the at least two microphone audio signals.

The means configured to determine at least one first audio signal combination or selection and at least one second audio signal combination or selection may be further configured to process at least one of the at least one first audio signal combination or selection and the at least one second audio signal combination or selection.

The means configured to process at least one of the at least one first audio signal combination or selection and the at least one second audio signal combination or selection may be configured to perform at least one of: select and equalize the at least one first audio signal combination or selection; select and equalize the at least one second audio signal combination or selection; weight and combine the at least one first audio signal combination or selection; and weight and combine the at least one second audio signal combination or selection.

The means configured to determine at least one value related to the sound arriving from the same or similar direction may be configured to determine the at least one value related to the sound arriving from the same or similar direction based on the at least one first audio signal combination or selection and at least one second audio signal combination or selection.

The means configured to determine further audio data comprising at least one configuration which provides a more omnidirectional directivity configuration than the audio data may be configured to determine at least one further audio signal combination or selection from the at least two microphone audio signals, the at least one further audio signal combination or selection providing a more omnidirectional audio signal capture than at least one of the at least one first audio signal combination or selection from the at least two microphone audio signals and the at least one second audio signal combination or selection.

The means configured to determine at least one further audio signal combination or selection may be further configured to process the at least one further audio signal combination or selection.

The means configured to determine at least one value related to the sound based on the further audio data may be configured to determine the at least one value related to the sound based on the at least one further audio signal combination or selection.

The at least first audio signal combination or selection and at least one second audio signal combination or selection may represent spatially selective audio signals steered with respect to the same or similar direction but having different spatial configurations.

The means configured to determine the at least one first audio signal combination or selection and the at least one second audio signal combination or selection may be configured to determine the at least one first audio signal combination or selection for at least two frequency bands and the at least one second audio signal combination or selection for the at least two frequency bands, the means configured to determine the at least one value related to the sound arriving from the same or similar direction is configured to determine the at least one target value based on the at least one first audio signal combination and at least one second audio signal combination for the at least two frequency bands, the means configured to determine the further audio data comprising at least one configuration which provides a more omnidirectional directivity configuration than the audio data may be configured to determine at least one further audio signal combination or selection for the at least two frequency bands, the means configured to determine at least one value related to the sound based on the further audio data may be configured to determine the at least one overall value based on the at least one further audio signal combination or selection for the at least two frequency bands, the means configured to determine the at least one noise suppression parameter based on the at least one value related to the sound arriving from the same or similar direction and the at least one value related to the sound may be configured to determine the at least one noise suppression parameter based on the at least one target value and the at least one overall value for the at least two frequency bands.

The means configured to determine the at least one value related to the sound arriving from the same or similar direction may be configured to determine at least one of: at least one target energy value; at least one target normalised amplitude value; and at least one target prominence value.

The means configured to determine at least one value related to the sound based on the further audio data may be configured to determine at least one of: at least one overall energy value; at least one overall normalised amplitude value; and at least one overall prominence value, such that the means configured to determine the at least one noise suppression parameter based on the at least one value related to the sound arriving from the same or similar direction and the at least one value related to the sound may be configured to determine the at least one noise suppression parameter based on the ratio between the at least one value related to the sound arriving from the same or similar direction and the at least one value related to the sound.

The at least one second audio signal combination or selection may be the at least one further audio signal combination or selection.

The different spatial configurations may comprise one of: different directivity patterns; different beam patterns; and different spatial selectivity.

The means configured to determine audio data comprising different directivity configurations that are able to capture sound from substantially a same or similar direction may be configured to determine at least one first set of weights and at least one second set of weights, such that if the at least one first set of weights and at least one second set of weights are applied to the microphone audio signals, a produced signal combination or selection represents sound from substantially a same or similar direction.

The means configured to determine at least one value related to the sound arriving from the same or similar direction may be configured to determine the at least one value related to the sound arriving from the same or similar direction based on the at least one first set of weights, the at least one second set of weights and at least one determined covariance matrix based on the least two microphone audio signals.

The means configured to determine further audio data comprising at least one configuration which provides a more omnidirectional directivity configuration than the audio data may be configured to determine at least one third set of weights, such that if applied to the microphone signals a produced signal combination or selection represents sound which provides a more omnidirectional audio signal than the produced signal if the at least one first set of weights and/or at least one second set of weights were applied to the microphone audio signals.

The means configured to determine at least one value related to the sound based on the further audio data may be configured to determine the at least one value related to the sound based on the at least one third set of weights and at least one determined covariance matrix based on the least two microphone audio signals.

The means may be further configured to: time-frequency domain transform the least two microphone audio signals; and determine at least one covariance matrix based on the time-frequency domain transformed version of the least two microphone audio signals.

The means may be further configured to spatially noise suppression process the at least two microphone audio signals based on the at least one spatial noise suppression parameter.

The means may be further configured to perform at least one of: apply a microphone signal equalization to the at least two microphone audio signals; apply a microphone noise reduction to the at least two microphone audio signals; apply a wind noise reduction to the at least two microphone audio signals; and apply an automatic gain control to the at least two microphone audio signals.

The means may be further configured to generate at least two output audio signals based on the spatially noise suppression processed at least two microphone audio signals.

The means configured to determine audio data comprising different directivity configurations that are able to capture sound from substantially a same or similar direction may be configured to: obtain at least one first microphone array steering vector; and generate at least one first set of beamform weights based on the at least one first microphone array steering vector and the same or similar direction.

The at least one first set of weights may be the at least one first set of beamform weights.

The means configured to determine the at least one first audio signal combination or selection and the at least one second audio signal combination or selection may be configured to apply the at least one first set of beamform weights to the at least two microphone audio signals to generate the at least one first audio signal combination or selection.

The means configured to generate at least one first set of beamform weights based on the at least one first microphone array steering vector and the same or similar direction may be configured to generate the at least one first set of beamform weights using a noise matrix that is based on two steering vectors which refer to steering vectors at 90 degrees left and 90 degrees right from the direction. The means configured to determine audio data comprising different directivity configurations that are able to capture sound from substantially a same or similar direction may be configured to: obtain at least one second microphone array steering vector; and generate at least one second set of beamform weights based on the at least one second microphone array steering vector and the same or similar direction.

The at least one second set of weights may be the at least one second set of beamform weights.

The means configured to determine at least one first audio signal combination or selection and at least one second audio signal combination or selection may be configured to apply the at least one second set of beamform weights to the at least two microphone audio signals to generate the at least one second audio signal combination or selection.

The means configured to generate at least one second set of beamform weights based on the at least one first microphone array steering vector and the same or similar direction may be configured to generate the at least one second set of beamform weights using a noise matrix that is based on a selected even set of directions.

The means configured to determine the further audio data comprising at least one configuration which provides a more omnidirectional directivity configuration than the audio data may be configured to: obtain at least one third microphone array steering vector; and generate at least one third set of beamform weights based on the at least one third microphone array steering vector and the same or similar direction.

The at least one third set of weights may be the at least one third set of beamform weights.

The means configured to determine at least one further audio signal combination or selection may be configured to apply the at least one third set of beamform weights to the at least two microphone audio signals to generate the at least one further audio signal combination or selection.

The means configured to generate at least one third set of beamform weights based on the at least one third microphone array steering vector and the same or similar direction may be configured to generate the at least one third set of beamform weights using a noise matrix that is based on an identity matrix and zeroing the steering vectors except for one entry.

The at least one value related to the sound arriving from at least the same or similar direction based on the audio data may be at least one value related to an amount of the sound arriving from at least the same or similar direction based on the audio data.

The at least one value related to the sound may be at least one value related to an amount of the sound.

According to a second aspect there is provided a method comprising: obtaining at least two microphone audio signals; determining audio data comprising different directivity configurations that are able to capture sound from substantially a same or similar direction; determining at least one value related to the sound arriving from at least the same or similar direction based on the audio data; determining further audio data comprising at least one configuration which provides a more omnidirectional directivity configuration than the audio data; determining at least one value related to the sound based on the further audio data; and determining at least one noise suppression parameter based on the at least one value related to the sound arriving from the same or similar direction and the at least one value related to the sound, wherein the at least one spatial noise suppression parameter is configured to be applied to the at least two microphone audio signals in the generation of at least one playback audio signal.

Determining audio data comprising different directivity configurations that are able to capture sound from substantially a same or similar direction may comprise determining at least one first audio signal combination or selection from the at least two microphone audio signals and at least one second audio signal combination or selection from the at least two microphone audio signals.

Determining at least one first audio signal combination or selection and at least one second audio signal combination or selection may comprise processing at least one of the at least one first audio signal combination or selection and the at least one second audio signal combination or selection.

Processing at least one of the at least one first audio signal combination or selection and the at least one second audio signal combination or selection may comprise at least one of: selecting and equalizing the at least one first audio signal combination or selection; selecting and equalizing the at least one second audio signal combination or selection; weighting and combining the at least one first audio signal combination or selection; and weighting and combining the at least one second audio signal combination or selection.

Determining at least one value related to the sound arriving from the same or similar direction may comprise determining the at least one value related to the sound arriving from the same or similar direction based on the at least one first audio signal combination or selection and at least one second audio signal combination or selection.

Determining further audio data comprising at least one configuration which provides a more omnidirectional directivity configuration than the audio data may comprise determining at least one further audio signal combination or selection from the at least two microphone audio signals, the at least one further audio signal combination or selection providing a more omnidirectional audio signal capture than at least one of the at least one first audio signal combination or selection from the at least two microphone audio signals and the at least one second audio signal combination or selection.

Determining at least one further audio signal combination or selection may comprise processing the at least one further audio signal combination or selection.

Determining at least one value related to the sound based on the further audio data may comprise determining the at least one value related to the sound based on the at least one further audio signal combination or selection.

The at least first audio signal combination or selection and at least one second audio signal combination or selection may represent spatially selective audio signals steered with respect to a same or similar direction but having different spatial configurations.

Determining the at least one first audio signal combination or selection and the at least one second audio signal combination or selection may comprise determining the at least one first audio signal combination or selection for at least two frequency bands and the at least one second audio signal combination or selection for the at least two frequency bands, determining the at least one value related to the sound arriving from the same or similar direction comprise determining the at least one target value based on the at least one first audio signal combination and at least one second audio signal combination for the at least two frequency bands, determining the further audio data comprising at least one configuration which provides a more omnidirectional directivity configuration than the audio data may comprise determining at least one further audio signal combination or selection for the at least two frequency bands, determining at least one value related to the sound based on the further audio data may comprise determining the at least one overall value based on the at least one further audio signal combination or selection for the at least two frequency bands, determining the at least one noise suppression parameter based on the at least one value related to the sound arriving from the same or similar direction and the at least one value related to the sound may comprise determining the at least one noise suppression parameter based on the at least one target value and the at least one overall value for the at least two frequency bands.

Determining the at least one value related to the sound arriving from the same or similar direction may comprise determining at least one of: at least one target energy value; at least one target normalised amplitude value; and at least one target prominence value.

Determining at least one value related to the sound based on the further audio data may comprise determining at least one of: at least one overall energy value; at least one overall normalised amplitude value; and at least one overall prominence value, such that determining the at least one noise suppression parameter based on the at least one value related to the sound arriving from the same or similar direction and the at least one value related to the sound may comprise determining the at least one noise suppression parameter based on the ratio between the at least one value related to the sound arriving from the same or similar direction and the at least one value related to the sound.

The at least one second audio signal combination or selection may be the at least one further audio signal combination or selection.

The different spatial configurations may comprise one of: different directivity patterns; different beam patterns; and different spatial selectivity.

Determining audio data comprising different directivity configurations that are able to capture sound from substantially a same or similar direction may comprise determining at least one first set of weights and at least one second set of weights, such that if the at least one first set of weights and at least one second set of weights are applied to the microphone audio signals, a produced signal combination or selection represents sound from substantially a same or similar direction.

Determining at least one value related to the sound arriving from the same or similar direction may comprise determining the at least one value related to the sound arriving from the same or similar direction based on the at least one first set of weights, the at least one second set of weights and at least one determined covariance matrix based on the least two microphone audio signals.

Determining further audio data comprising at least one configuration which provides a more omnidirectional directivity configuration than the audio data may comprise determining at least one third set of weights, such that if applied to the microphone signals a produced signal combination or selection represents sound which provides a more omnidirectional audio signal than the produced signal than if the at least one first set of weights and/or at least one second set of weights were applied to the microphone audio signals.

Determining at least one value related to the sound based on the further audio data may comprise determining the at least one value related to the sound based on the at least one third set of weights and at least one determined covariance matrix based on the least two microphone audio signals.

The method may comprise: time-frequency domain transforming the least two microphone audio signals; and determining at least one covariance matrix based on the time-frequency domain transformed version of the least two microphone audio signals.

The method may comprise spatially noise suppression processing the at least two microphone audio signals based on the at least one spatial noise suppression parameter.

The method may further comprise at least one of: applying a microphone signal equalization to the at least two microphone audio signals; applying a microphone noise reduction to the at least two microphone audio signals; applying a wind noise reduction to the at least two microphone audio signals; and applying an automatic gain control to the at least two microphone audio signals.

The method may further comprise generating at least two output audio signals based on the spatially noise suppression processed at least two microphone audio signals.

Determining audio data comprising different directivity configurations that are able to capture sound from substantially a same or similar direction may comprise: obtaining at least one first microphone array steering vector; and generating at least one first set of beamform weights based on the at least one first microphone array steering vector and the same or similar direction.

The at least one first set of weights may be the at least one first set of beamform weights.

Determining the at least one first audio signal combination or selection and the at least one second audio signal combination or selection may comprise applying the at least one first set of beamform weights to the at least two microphone audio signals to generate the at least one first audio signal combination or selection.

Generating at least one first set of beamform weights based on the at least one first microphone array steering vector and the same or similar direction may comprise generating the at least one first set of beamform weights using a noise matrix that is based on two steering vectors which refer to steering vectors at 90 degrees left and 90 degrees right from the same or similar direction.

Determining audio data comprising different directivity configurations that are able to capture sound from substantially a same or similar direction may comprise: obtaining at least one second microphone array steering vector; and generating at least one second set of beamform weights based on the at least one second microphone array steering vector and the same or similar direction.

The at least one second set of weights may be the at least one second set of beamform weights.

Determining at least one first audio signal combination or selection and at least one second audio signal combination or selection may comprise applying the at least one second set of beamform weights to the at least two microphone audio signals to generate the at least one second audio signal combination or selection.

Generating at least one second set of beamform weights based on the at least one first microphone array steering vector and the same or similar direction may comprise generating the at least one second set of beamform weights using a noise matrix that is based on a selected even set of directions.

Determining the further audio data comprising at least one configuration which provides a more omnidirectional directivity configuration than the audio data may comprise: obtaining at least one third microphone array steering vector; and generating at least one third set of beamform weights based on the at least one third microphone array steering vector and the same or similar direction.

The at least one third set of weights may be the at least one third set of beamform weights.

Determining at least one further audio signal combination or selection may comprise applying the at least one third set of beamform weights to the at least two microphone audio signals to generate the at least one further audio signal combination or selection.

Generating at least one third set of beamform weights based on the at least one third microphone array steering vector and the same or similar direction may comprise generating the at least one third set of beamform weights using a noise matrix that is based on an identity matrix and zeroing the steering vectors except for one entry.

The at least one value related to the sound arriving from at least the same or similar direction based on the audio data may be at least one value related to an amount of the sound arriving from at least the same or similar direction based on the audio data.

The at least one value related to the sound may be at least one value related to an amount of the sound.

According to a third aspect there is provided an apparatus comprising at least one processor and at least one memory including a computer program code, the at least one memory and the computer program code configured to, with the at least one processor, cause the apparatus at least to: obtain at least two microphone audio signals; determine audio data comprising different directivity configurations that are able to capture sound from substantially a same or similar direction; determine at least one value related to the sound arriving from at least the same or similar direction based on the audio data; determine further audio data comprising at least one configuration which provides a more omnidirectional directivity configuration than the audio data; determine at least one value related to the sound based on the further audio data; and determine at least one noise suppression parameter based on the at least one value related to the sound arriving from the same or similar direction and the at least one value related to the sound, wherein the at least one spatial noise suppression parameter is configured to be applied to the at least two microphone audio signals in the generation of at least one playback audio signal.

The apparatus caused to determine audio data comprising different directivity configurations that are able to capture sound from substantially a same or similar direction may be caused to determine at least one first audio signal combination or selection from the at least two microphone audio signals and at least one second audio signal combination or selection from the at least two microphone audio signals.

The apparatus caused to determine at least one first audio signal combination or selection and at least one second audio signal combination or selection may be further caused to process at least one of the at least one first audio signal combination or selection and the at least one second audio signal combination or selection.

The apparatus caused to process at least one of the at least one first audio signal combination or selection and the at least one second audio signal combination or selection may be caused to perform at least one of: select and equalize the at least one first audio signal combination or selection; select and equalize the at least one second audio signal combination or selection; weight and combine the at least one first audio signal combination or selection; and weight and combine the at least one second audio signal combination or selection.

The apparatus caused to determine at least one value related to the sound arriving from the same or similar direction may be caused to determine the at least one value related to the sound arriving from the same or similar direction based on the at least one first audio signal combination or selection and at least one second audio signal combination or selection.

The apparatus caused to determine further audio data comprising at least one configuration which provides a more omnidirectional directivity configuration than the audio data may be caused to determine at least one further audio signal combination or selection from the at least two microphone audio signals, the at least one further audio signal combination or selection providing a more omnidirectional audio signal capture than at least one of the at least one first audio signal combination or selection from the at least two microphone audio signals and the at least one second audio signal combination or selection.

The apparatus caused to determine at least one further audio signal combination or selection may be further caused to process the at least one further audio signal combination or selection.

The apparatus caused to determine at least one value related to the sound based on the further audio data may be caused to determine the at least one value related to the sound based on the at least one further audio signal combination or selection.

The at least first audio signal combination or selection and at least one second audio signal combination or selection may represent spatially selective audio signals steered with respect to the same or similar direction but having different spatial configurations.

The apparatus caused to determine the at least one first audio signal combination or selection and the at least one second audio signal combination or selection may be caused to determine the at least one first audio signal combination or selection for at least two frequency bands and the at least one second audio signal combination or selection for the at least two frequency bands, the apparatus caused to determine the at least one value related to the sound arriving from the same or similar direction may be caused to determine the at least one target value based on the at least one first audio signal combination and at least one second audio signal combination for the at least two frequency bands, the apparatus caused to determine the further audio data comprising at least one configuration which provides a more omnidirectional directivity configuration than the audio data may be caused to determine at least one further audio signal combination or selection for the at least two frequency bands, the apparatus caused to determine at least one value related to the sound based on the further audio data may be caused to determine the at least one overall value based on the at least one further audio signal combination or selection for the at least two frequency bands, the apparatus caused to determine the at least one noise suppression parameter based on the at least one value related to the sound arriving from the same or similar direction and the at least one value related to the sound may be caused to determine the at least one noise suppression parameter based on the at least one target value and the at least one overall value for the at least two frequency bands.

The apparatus caused to determine the at least one value related to the sound arriving from the same or similar direction may be caused to determine at least one of: at least one target energy value; at least one target normalised amplitude value; and at least one target prominence value.

The apparatus caused to determine at least one value related to the sound based on the further audio data may be caused to determine at least one of: at least one overall energy value; at least one overall normalised amplitude value; and at least one overall prominence value, such that the apparatus caused to determine the at least one noise suppression parameter based on the at least one value related to the sound arriving from the same or similar direction and the at least one value related to the sound may be caused to determine the at least one noise suppression parameter based on the ratio between the at least one value related to the sound arriving from the same or similar direction and the at least one value related to the sound.

The at least one second audio signal combination or selection may be the at least one further audio signal combination or selection.

The different spatial configurations may comprise one of: different directivity patterns; different beam patterns; and different spatial selectivity.

The apparatus caused to determine audio data comprising different directivity configurations that are able to capture sound from substantially a same or similar direction may be caused to determine at least one first set of weights and at least one second set of weights, such that if the at least one first set of weights and at least one second set of weights are applied to the microphone audio signals, a produced signal combination or selection represents sound from substantially a same or similar direction.

The apparatus caused to determine at least one value related to the sound arriving from the same or similar direction may be caused to determine the at least one value related to the sound arriving from the same or similar direction based on the at least one first set of weights, the at least one second set of weights and at least one determined covariance matrix based on the least two microphone audio signals.

The apparatus caused to determine further audio data comprising at least one configuration which provides a more omnidirectional directivity configuration than the audio data may be caused to determine at least one third set of weights, such that if applied to the microphone signals a produced signal combination or selection represents sound which provides a more omnidirectional audio signal than the produced signal if the at least one first set of weights and/or at least one second set of weights were applied to the microphone audio signals.

The apparatus caused to determine at least one value related to the sound based on the further audio data may be caused to determine the at least one value related to the sound based on the third set of weights and at least one determined covariance matrix based on the least two microphone audio signals.

The apparatus may be caused to: time-frequency domain transform the least two microphone audio signals; and determine at least one covariance matrix based on the time-frequency domain transformed version of the least two microphone audio signals.

The apparatus may be caused to spatially noise suppression process the at least two microphone audio signals based on the at least one spatial noise suppression parameter.

The apparatus may be caused to perform at least one of: apply a microphone signal equalization to the at least two microphone audio signals; apply a microphone noise reduction to the at least two microphone audio signals; apply a wind noise reduction to the at least two microphone audio signals; and apply an automatic gain control to the at least two microphone audio signals.

The apparatus may be caused to generate at least two output audio signals based on the spatially noise suppression processed at least two microphone audio signals.

The apparatus caused to determine audio data comprising different directivity configurations that are able to capture sound from substantially a same or similar direction may be caused to: obtain at least one first microphone array steering vector; and generate at least one first set of beamform weights based on the at least one first microphone array steering vector and the same or similar direction.

The at least one first set of weights may be the at least one first set of beamform weights.

The apparatus caused to determine the at least one first audio signal combination or selection and the at least one second audio signal combination or selection may be caused to apply the at least one first set of beamform weights to the at least two microphone audio signals to generate the at least one first audio signal combination or selection.

The apparatus caused to generate at least one first set of beamform weights based on the at least one first microphone array steering vector and the same or similar direction may be caused to generate the at least one first set of beamform weights using a noise matrix that is based on two steering vectors which refer to steering vectors at 90 degrees left and 90 degrees right from the same or similar direction.

The apparatus caused to determine audio data comprising different directivity configurations that are able to capture sound from substantially a same or similar direction may be caused to: obtain at least one second microphone array steering vector; and generate at least one second set of beamform weights based on the at least one second microphone array steering vector and the same or similar direction.

The at least one second set of weights may be the at least one second set of beamform weights.

The apparatus caused to determine at least one first audio signal combination or selection and at least one second audio signal combination or selection may be caused to apply the at least one second set of beamform weights to the at least two microphone audio signals to generate the at least one second audio signal combination or selection.

The apparatus caused to generate at least one second set of beamform weights based on the at least one first microphone array steering vector and the same or similar direction may be caused to generate the at least one second set of beamform weights using a noise matrix that is based on a selected even set of directions.

The apparatus caused to determine the further audio data comprising at least one configuration which provides a more omnidirectional directivity configuration than the audio data may be caused to: obtain at least one third microphone array steering vector; and generate at least one third set of beamform weights based on the at least one third microphone array steering vector and the same or similar direction.

The at least one third set of weights may be the at least one third set of beamform weights.

The apparatus caused to determine at least one further audio signal combination or selection may be caused to apply the at least one third set of beamform weights to the at least two microphone audio signals to generate the at least one further audio signal combination or selection.

The apparatus caused to generate at least one third set of beamform weights based on the at least one third microphone array steering vector and the same or similar direction may be caused to generate the at least one third set of beamform weights using a noise matrix that is based on an identity matrix and zeroing the steering vectors except for one entry.

The at least one value related to the sound arriving from at least the same or similar direction based on the audio data may be at least one value related to an amount of the sound arriving from at least the same or similar direction based on the audio data.

The at least one value related to the sound may be at least one value related to an amount of the sound.

According to a fourth aspect there is provided an apparatus comprising: obtaining circuitry configured to obtain at least two microphone audio signals; determining circuitry configured to determine audio data comprising different directivity configurations that are able to capture sound from substantially a same or similar direction; determining circuitry configured to determine at least one value related to the sound arriving from at least the same or similar direction based on the audio data; determining circuitry configured to determine further audio data comprising at least one configuration which provides a more omnidirectional directivity configuration than the audio data; determining circuitry configured to determine at least one value related to the sound based on the further audio data; and determine at least one noise suppression parameter based on the at least one value related to the sound arriving from the same or similar direction and the at least one value related to the sound, wherein the at least one spatial noise suppression parameter is configured to be applied to the at least two microphone audio signals in the generation of at least one playback audio signal.

According to a fifth aspect there is provided a computer program comprising instructions [or a computer readable medium comprising program instructions] for causing an apparatus to perform at least the following: obtain at least two microphone audio signals; determine audio data comprising different directivity configurations that are able to capture sound from substantially a same or similar direction; determine at least one value related to the sound arriving from at least the same or similar direction based on the audio data; determine further audio data comprising at least one configuration which provides a more omnidirectional directivity configuration than the audio data; determine at least one value related to the sound based on the further audio data; and determine at least one noise suppression parameter based on the at least one value related to the sound arriving from the same or similar direction and the at least one value related to the sound, wherein the at least one spatial noise suppression parameter is configured to be applied to the at least two microphone audio signals in the generation of at least one playback audio signal.

According to a sixth aspect there is provided a non-transitory computer readable medium comprising program instructions for causing an apparatus to perform at least the following: obtain at least two microphone audio signals; determine audio data comprising different directivity configurations that are able to capture sound from substantially a same or similar direction; determine at least one value related to the sound arriving from at least the same or similar direction based on the audio data; determine further audio data comprising at least one configuration which provides a more omnidirectional directivity configuration than the audio data; determine at least one value related to the sound based on the further audio data; and determine at least one noise suppression parameter based on the at least one value related to the sound arriving from the same or similar direction and the at least one value related to the sound, wherein the at least one spatial noise suppression parameter is configured to be applied to the at least two microphone audio signals in the generation of at least one playback audio signal.

According to a seventh aspect there is provided an apparatus comprising: means for obtaining at least two microphone audio signals; means for determining audio data comprising different directivity configurations that are able to capture sound from substantially a same or similar direction; means for determining at least one value related to the sound arriving from at least the same or similar direction based on the audio data; means for determining further audio data comprising at least one configuration which provides a more omnidirectional directivity configuration than the audio data; means for determining at least one value related to the sound based on the further audio data; and means for determining at least one noise suppression parameter based on the at least one value related to the sound arriving from the same or similar direction and the at least one value related to the sound, wherein the at least one spatial noise suppression parameter is configured to be applied to the at least two microphone audio signals in the generation of at least one playback audio signal.

According to an eighth aspect there is provided a computer readable medium comprising program instructions for causing an apparatus to perform at least the following: obtain at least two microphone audio signals; determine audio data comprising different directivity configurations that are able to capture sound from substantially a same or similar direction; determine at least one value related to the sound arriving from at least the same or similar direction based on the audio data; determine further audio data comprising at least one configuration which provides a more omnidirectional directivity configuration than the audio data; determine at least one value related to the sound based on the further audio data; and determine at least one noise suppression parameter based on the at least one value related to the sound arriving from the same or similar direction and the at least one value related to the sound, wherein the at least one spatial noise suppression parameter is configured to be applied to the at least two microphone audio signals in the generation of at least one playback audio signal.

The at least one value related to the sound arriving from at least the same or similar direction based on the audio data may be at least one value related to an amount of the sound arriving from at least the same or similar direction based on the audio data.

The at least one value related to the sound may be at least one value related to an amount of the sound.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
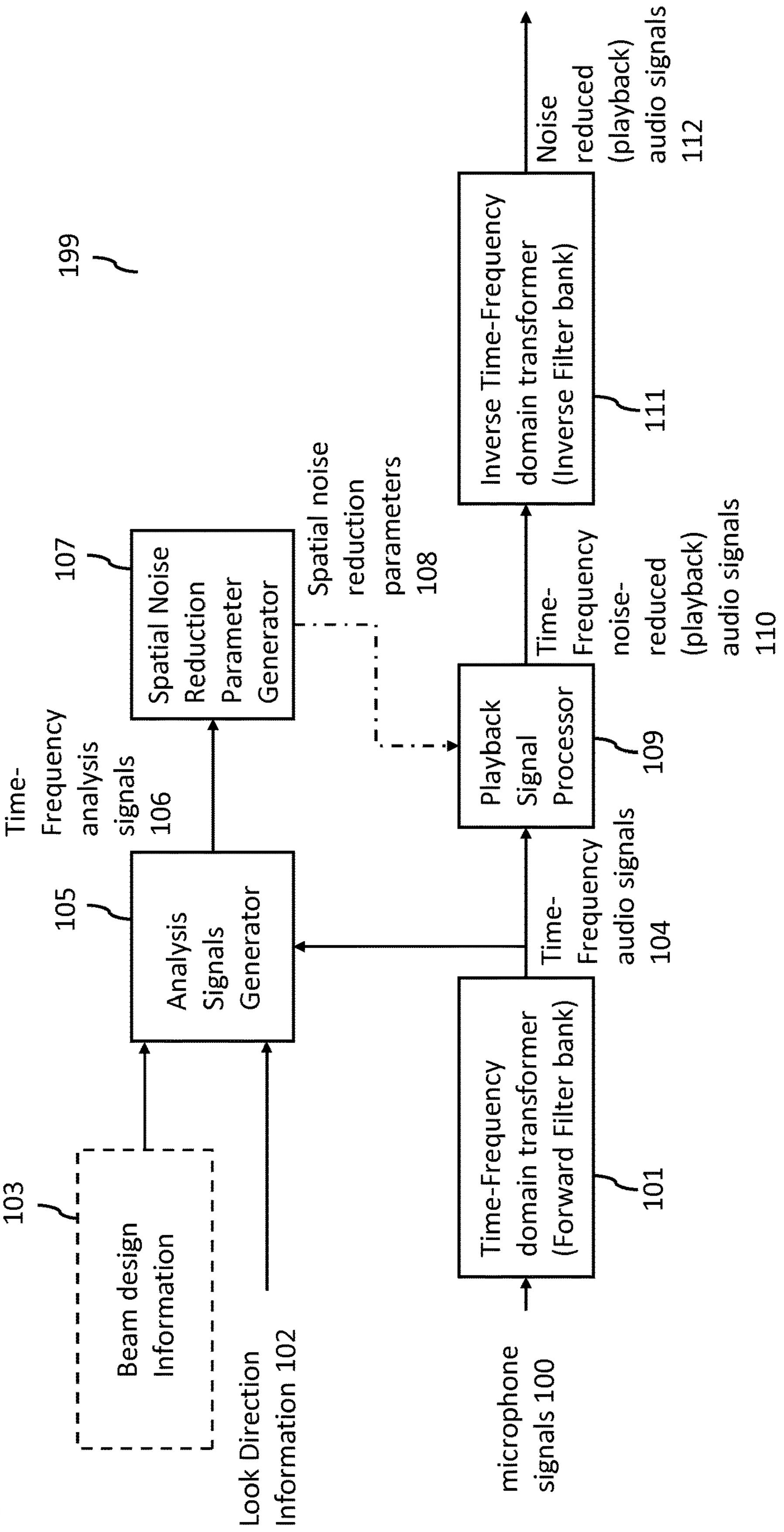
FIG. 1 shows schematically a spatial noise suppression system of apparatus suitable for implementing some embodiments.

The description herein features apparatus and method which can be considered to be within the category of post-filtering of beamformer output audio signals. However, in some embodiments the methods and apparatus are not limited to processing beamformer outputs, but also spatial outputs such as binaural or stereo outputs. In some embodiments the methods and apparatus are integrated as a part of a system generating a spatial audio signal, for example, a binaural audio signal. As such the concept as discussed in more detail hereafter is one of attempting to reduce spatial noise in audio signals from microphone array capture apparatus (for example from a mobile phone comprising multiple microphones), regardless of whether the situation is to capture beamformed sound, spatial sound, or any other sound.

As discussed earlier when a device is capturing video and audio with a suitable capture device such as a mobile phone, it can be located in environments that contain prominent background ambience and interfering sounds. Examples of such interfering/ambient sounds include traffic, wind through trees, sounds of the ocean, sounds of crowds, air conditioning sounds, and the sounds of a car/bus while a user of the device is a passenger.

When the user has captured the media and then reviews the captured audio and video afterwards, it is typical that the user is dissatisfied with the audio quality since the ambient/interfering sounds seem much more distracting when experienced from the captured audio than they were in the original scene. Sometimes it is even the case that the user was not aware of the interfering sounds while recoding, since the hearing system adapts, to a degree, to disregard constant interferers (such as air conditioning noise), but these sounds are noticed and are much more distracting when listening to the captured sound.

As a result, perceived audio quality of captured spatial audio is often poor due to unwanted noises and interfering sounds. Beamforming has been used to suppress these unwanted noises and interfering sounds, however, in mobile devices such as mobile phones, the desired capture goal is often not to beamform the sound, but to generate a spatial or wide stereo/binaural sound. Such an output is vastly different than a beamformed sound. In context of mobile device audio capture, there is a practical constraint in this regard. Namely, a stereo beamformed sound, which could sound wide perceptually, could be made by generating two beams: one with the left edge microphones, and another with the right edge microphones. However, when it comes to mobile devices, the number of microphones is almost always too low for such stereo beamforming effectively. Typical stereo-capture-enabled mobile devices have one microphone at each end of the device. Sometimes one edge has a second microphone. Such arrangements are not sufficient for generating spatially selective stereo beams at least at a sufficiently broad frequency range. Therefore, alternative strategies are needed to generate a spatially selective, but still wide/stereo/binaural sound output.

Alternatively, the unwanted noises and interfering sounds could be suppressed using a post filter designed based on the time-frequency direction analysis. However, with a mobile device form factor, the analysed directions are typically noisy, and thus only very mild spatial noise suppression can be achieved with such an approach without severe artefacts.

The embodiments herein thus attempt to compensate for/remove the presence of unwanted spatial noises and interfering sounds in the captured spatial (e.g. binaural) or stereo audio, which significantly deteriorates the audio quality.

The embodiments as discussed herein attempt to suppress spatial noise (e.g., traffic or environmental noise) in spatial or stereo audio capturing by determining noise suppression parameters based on three (or more) signal combinations or selections generated by combining or selecting microphone signals in three (or more) different ways, where the combination or selection is based on at least two microphone signals.

In the following examples there are described three signal combinations based on at least two audio signals but it is understood that this could be scaled up to more microphones and more signal combinations. The first and second signal combinations represent spatially selective signals, both steered towards the same 'look' direction but having mutually substantially different spatial selectivity. A 'look' direction is a direction that is spatially emphasized in the captured audio with respect to other directions, i.e., the direction in which the audio signals are focused. A cross-correlation of these two signal combinations is computed in frequency bands providing an estimate of the sound energy at the look direction. The third signal combination, or more specifically, signal selection, represents a substantially more omnidirectional signal, providing an energy estimate of the overall sound. It is generated based on selected microphone signal (s), which does not feature significant spatial selectivity when compared to the first and second signal combinations. Based on this information (sound energy at look direction and overall sound energy), a parameter (e.g., a gain) for noise suppression is determined in frequency bands. This parameter is applied in suppressing noise of playback signal (s) in frequency bands.

In some embodiments, the playback signals (where the spatial noises are suppressed) comprise a fourth signal set, e.g., stereo or binaural signals generated based on the microphone signals. The playback signals may be processed with any necessary further procedures (applied before or after the spatial noise suppression), such as, wind noise reduction, microphone noise reduction, equalization, and/or automatic gain control.

With respect to FIG. 1 is shown a schematic view of an example spatial noise suppressor.

A first input to the spatial noise suppressor 199 is the microphone audio signals 100. The three or more microphones audio signals 100 may be obtained directly from the microphones mounted on a mobile device or from storage or via a wireless or wired communications link. In the embodiments described herein the microphones are microphones mounted on a mobile phone however audio signals from other microphone arrays may be used in some embodiments. For example the microphone audio signals may comprise B-format microphone or Eigenmike audio signals. In the examples shown herein there are 3 microphones however embodiments may be implemented where there are 2 or more microphones.

The spatial noise suppressor 199 may comprise a time-frequency domain transformer (or forward filter bank) 101. The time-frequency domain transformer 101 is configured to receive the (time-domain) microphone audio signals 100 and convert them to the time-frequency domain. Suitable forward filters or transforms include, e.g., short-time Fourier transform (STFT) and complex-modulated quadrature mirror filter (QMF) bank. The output of the time-frequency domain transformer is the time-frequency audio signals 104. The time-frequency domain audio signals may be represented as S(b, n, i), where b is the frequency bin index, n is the time index and i=1 . . . N is the microphone channel index, where N≥2 is the number of microphone signals being used. The time-frequency signals S(b, n, i) can in some embodiments be provided to an analysis signals generator 105 and playback signal processor 109. It should be realised that in some embodiments where the microphone audio signals are obtained in the time-frequency domain that the spatial noise suppressor 199 may not comprise a time-frequency domain transformer and the audio signals would then be passed directly to the analysis signals generator 105 and playback signal processor 109.

A further input to the spatial noise suppressor 199 is the beam design information 103. The beam design information 103 in some embodiments comprises complex-valued beamforming weights related to the capture device or data enabling determination of complex valued weights, for example, steering vectors in frequency bins or impulse responses. The beam design information 103 can be provided to the analysis signals generator 105.

An additional input to the spatial noise suppressor 199 is the look direction information 102. The look direction information 102 indicates the desired 'look' direction or pointing direction, for example, the 'rear facing' main camera or 'front facing' selfie camera direction in a mobile phone. The look direction information 102 in some embodiments is configured to be provided to the analysis signals generator 105.

In some embodiments spatial noise suppressor 199 may comprise an analysis signals generator 105. The analysis signals generator 105 is configured to obtain the time-frequency audio signals 104, the beam design information 103 and the look direction information 102. The analysis signals generator 105 is configured to perform, in frequency bins, three combinations or selections of the time-frequency audio signals 104 using complex-valued weights that are contained in (or, alternatively, determined based on) the beam design information 103. The output of the analysis signals generator may comprise three audio channels of such combinations, which are the time-frequency analysis signals 106. The time-frequency analysis signals 106 may then be provided to a spatial noise reduction parameter generator 107.

In some embodiments spatial noise suppressor 199 may comprise a spatial noise reduction parameter generator 107. The spatial noise reduction parameter generator 107 is configured to obtain the time-frequency analysis signals 106 and estimate (based on the time-frequency analysis signals 106) a ratio value that indicates how large the overall sound energy at the microphone signals is from a desired look direction. Based on this information, a spectral gain factor g(k, n) is determined, where k is the frequency band index. A frequency band may contain one or more frequency bins b, where each frequency band has a lowest bin $b_{low}(k)$ and a highest bin $b_{high}(k)$. Typically, the frequency bands are configured to contain more bins towards the higher frequencies. The spectral gain factors g(k, n) are an example of the spatial noise reduction parameters 108 which may be output from the spatial noise reduction parameter generator. Other examples of spatial noise reduction parameters 108 include an energetic ratio value indicating the proportion of the sound from the look direction, or the proportion of the sounds at other directions, with respect to the overall captured sound energy. The spatial noise reduction parameters 108 may then be passed to the playback signal processor 109.

In some embodiments the spatial noise suppressor 199 may comprise a playback signal processor 109. The playback signal processor 109 is configured to receive the time-frequency audio signals 104 and the spatial noise reduction parameters 108 and is configured to generate time-frequency noise-reduced (playback) audio signals 110. The playback signal processor 109 is configured to apply the spatial noise reduction parameters 108 to suppress the spatial noise energy at the time-frequency audio signals 104. In some embodiments the playback signal processor 109 is configured to multiply the bins of each band k with the spectral gain factors g(k, n), to generate the time-frequency noise reduced (playback) audio signals 110 but other configurations and methods are described further below. The time-frequency noise-reduced (playback) audio signals 110 in some embodiments can then be passed to an inverse time-frequency domain transformer 111 or inverse filter bank.

In some embodiments the spatial noise suppressor 199 may comprise an inverse time-frequency domain transformer 111 configured to receive the time-frequency noise-reduced (playback) audio signals 110 and applies the inverse transform corresponding to the forward transform applied at the time-frequency domain transformer 101 or forward filter bank. For example, if the Forward filter bank implemented a STFT, then the inverse filter bank implements an inverse STFT. The output of the inverse time-frequency domain transformer 111 is thus noise reduced (playback) audio signals. In some embodiments where the output is a time-frequency domain audio signal format then the inverse time-frequency domain transformer 111 can be optional or bypassed.

Figure 2:
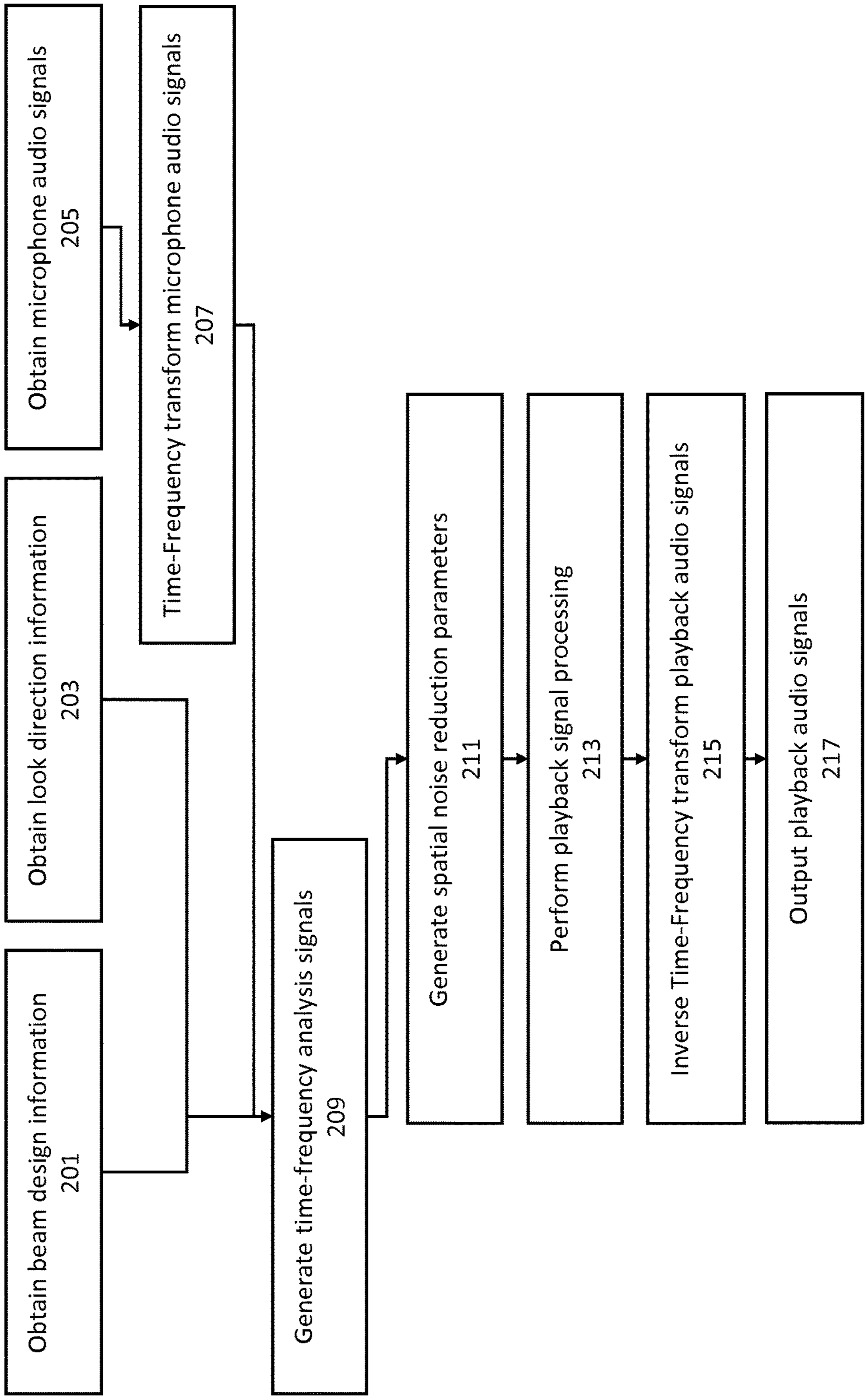
FIG. 2 shows a flow diagram of the operation of the example apparatus according to some embodiments.

With respect to FIG. 2 is shown the operation of the spatial noise suppressor according to some embodiments.

The beam design information is obtained as shown in FIG. 2 by step 201.

Furthermore the look direction information is obtained as shown in FIG. 2 by step 203.

Additionally the microphone audio signals are obtained as shown in FIG. 2 by step 205.

In some embodiments the microphone audio signals are time-frequency domain transformed as shown in FIG. 2 by step 207.

Then based on the time-frequency domain microphone audio signals, the beam design information and the look direction information the time-frequency analysis signals are generated as shown in FIG. 2 by step 209.

The spatial noise reduction parameters are then generated based on the time-frequency analysis signals as shown in FIG. 2 by step 211.

Then playback signal processing of the time-frequency audio signals is performed based on the spatial noise reduction parameters as shown in FIG. 2 by step 213.

In some embodiments the time-frequency playback signal processed audio signals are then inverse time-frequency transformed to generate time-domain playback audio signals as shown in FIG. 2 by step 215.

The time-domain playback audio signals can then be output as shown in FIG. 2 by step 217.

Figure 3:
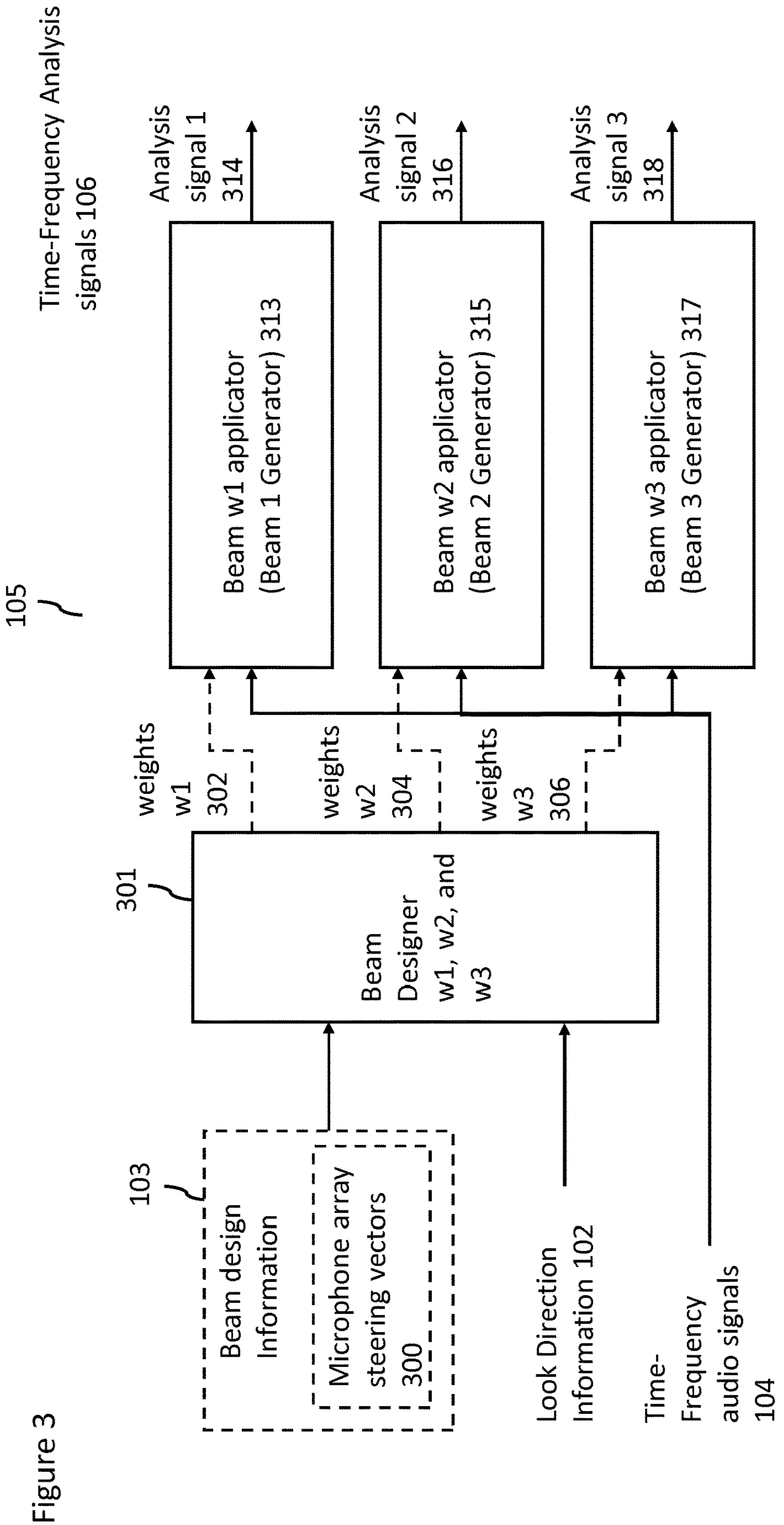
FIG. 3 shows schematically an example analysis signals generator as shown in FIG. 1 according to some embodiments.

With respect to FIG. 3 is shown an example of the analysis signals generator 105 in further detail. As shown with respect to FIG. 1 the analysis signals generator 105 is configured to receive an input which comprises the beam design information 103, which in this example are microphone array steering vectors 300. The microphone array steering vectors 300 can in some embodiments be complex-valued column vectors v(b, DOA) as a function of frequency bin b and the direction of arrival (DOA). The entries (rows) of the steering vectors correspond to different microphone channels. One steering vector may comprise a phase and amplitude response of a sound arriving from a particular DOA and a particular bin. In some embodiments, the beam design information 103 directly contains the beamforming weights (and in such embodiments the beam designer 301 is optional or may be bypassed).

Furthermore the analysis signals generator 105 is configured to receive the time-frequency audio signals 104 and the look direction information 102.

In some embodiments the analysis signals generator 105 comprises a beam designer 301. The beam designer 301 is configured to receive the steering vectors 300 and the look direction information 102 and is then configured to design beamforming weights. The design can be performed by using a minimum variance distortionless response (MVDR) method which can be summarized by the following operations.

The beam weights which generate the beams can be designed based on a steering vector for the look direction, and a noise covariance matrix. Although a MVDR beamformer is typically adapted in real-time, so that the signal covariance matrix is measured, and the beam weights are designed accordingly, in the following embodiments the MVDR method is applied for an initial determination of beam weights, and then the beam weights are fixed. The MVDR formula for beam weight design for a particular DOA may be determined as $$w(b) = \frac{R(b)^{-1}v(b, DOA)}{v^H(b, DOA)R(b)^{-1}v(b, DOA)}$$

where R(b) is the noise covariance matrix and superscript $R(b)^{-1}$ denotes inverse of R(b), and the superscript $v^H$ denotes the conjugate transpose of v. The matrix R(b) may be regularized by adding to its diagonal a small value prior to the inverse, e.g., a value that is 0.001 times the maximum diagonal value of R(b). Different beam weights for a given DOA can be designed by designing different noise matrices. In the beam designer 301, DOA is set as the look direction (based on the look direction information 102), and R(b) is designed in three different ways:

Firstly the beam weight vector $w_1(b)$ is designed using a noise matrix that is based on two steering vectors v(b, $DOA_{90}$) and v(b, $DOA_{-90}$), which refer to steering vectors at 90 degrees left and 90 degrees right from the look direction. The noise matrix is designed by $$R_1(b)=v(b,DOA_{90})v^H(b,DOA_{90})+v(b,DOA_{-90})v^H(b,DOA_{-90})$$

Such a noise matrix generates a pattern (at least at some frequencies) where a large attenuation is obtained at sides (i.e., at ±90 degrees in relation to the look direction) and a negative lobe at the rear (i.e., at 180 degrees in relation to the look direction).

Secondly the beam weight vector $w_2(b)$ is designed by selecting an even set of DOAs $DOA_d$ where d=1 . . . D and $$R_2(b) = \sum_{d=1}^{D} v(b, DOA_d)v^H(b, DOA_d)$$

Such a noise matrix generates a pattern that maximally suppresses ambient noise. This is because the noise covariance matrix was generated to be similar to what an ambient sound would generate, and the MVDR-type beam weight design then optimally attenuates it. Furthermore, as a relevant aspect for the present invention, typically the pattern has a significantly different shape than the one created with $R_1(b)$. Moreover, the both patterns have (ideally) the same response at the look direction.

Thirdly the beam weight vector $w_3(b)$ is designed by setting matrix $R_3(b)$ as an identity matrix. Furthermore, in designing $w_3(b)$, the steering vectors are zeroed except for one entry. As the result, the weight vector $w_3(b)$ in fact is only such that selects one microphone channel, and equalizes it to the look direction in the same way as beam weights for beams 1 and 2. Such a beam generated by these beam weights is significantly more omnidirectional than the beams 1 and 2.

In some embodiments, more than one set of beam weights of this sort is generated. For example one set of beam weights could be generated for a left-side microphone of the capture device ($w_{3,left}(b)$), and one set of beam weights for the right-side microphone of the capture device ($w_{3,right}(b)$).

The beam weights $w_1(b)$ 302, $w_2(b)$ 304, and $w_3(b)$ 306 may then be provided to their corresponding beam applicators 313, 315 and 317.

In some embodiments the analysis signals generator 105 comprises a set of beam weight applicators or beam generators (shown as separate Beam w1 applicator 313, Beam w2 applicator 315, and Beam w3 applicator 317 but may be implemented as single block) which are configured to receive the time-frequency audio signals 104 and the respective beam weights $w_1(b)$ 302, $w_2(b)$ 304, and $w_3(b)$ 306 and from these generate respective beams or in this example analysis signal 1 314, an analysis signal 2 316 and an analysis signal 3 318. For example in each block, the beamform weights are applied as:

$$S_x(b,n)=w_x^H(b)s(b,n)$$

where s(b, n) is a column vector that contains the channels i of the time-frequency signals S(b, n, i), e.g., for three channels $$s(b,n)=\begin{bmatrix}S(b,n,1)\\S(b,n,2)\\S(b,n,3)\end{bmatrix}.$$

The signals $S_1(b, n)$ 314, $S_2(b, n)$ 316 and $S_3(b, n)$ 318 are output as the time-frequency analysis signals 106.

In some embodiments the beam weights generated may effectively implement (when applied to the microphone audio signals) a selection or combination operation. They may implement a selection operation for example if only one entry in a beam weight vector is non-zero, and a combination operation otherwise. A selection operation may mean also omitting all but one microphone audio channel signals, and potentially applying (complex) processing gains to it in frequency bins. Furthermore these operations (of applying beam weights or processing gains) may be considered to be a suitable processing operation, and terms "equalizing" and "weighting" may mean multiplying signals with complex values in frequency bands.

Thus the beam weights which operate as a select and equalize operation may be interpreted as an operation of "selecting one microphone signal and equalizing it, in order to obtain that first audio signal combination or selection", similarly a weight and combine operation may be interpreted as an operation of "weighting one microphone signal and combining it with other microphone signals (which may be also weighted)".

Figure 4:
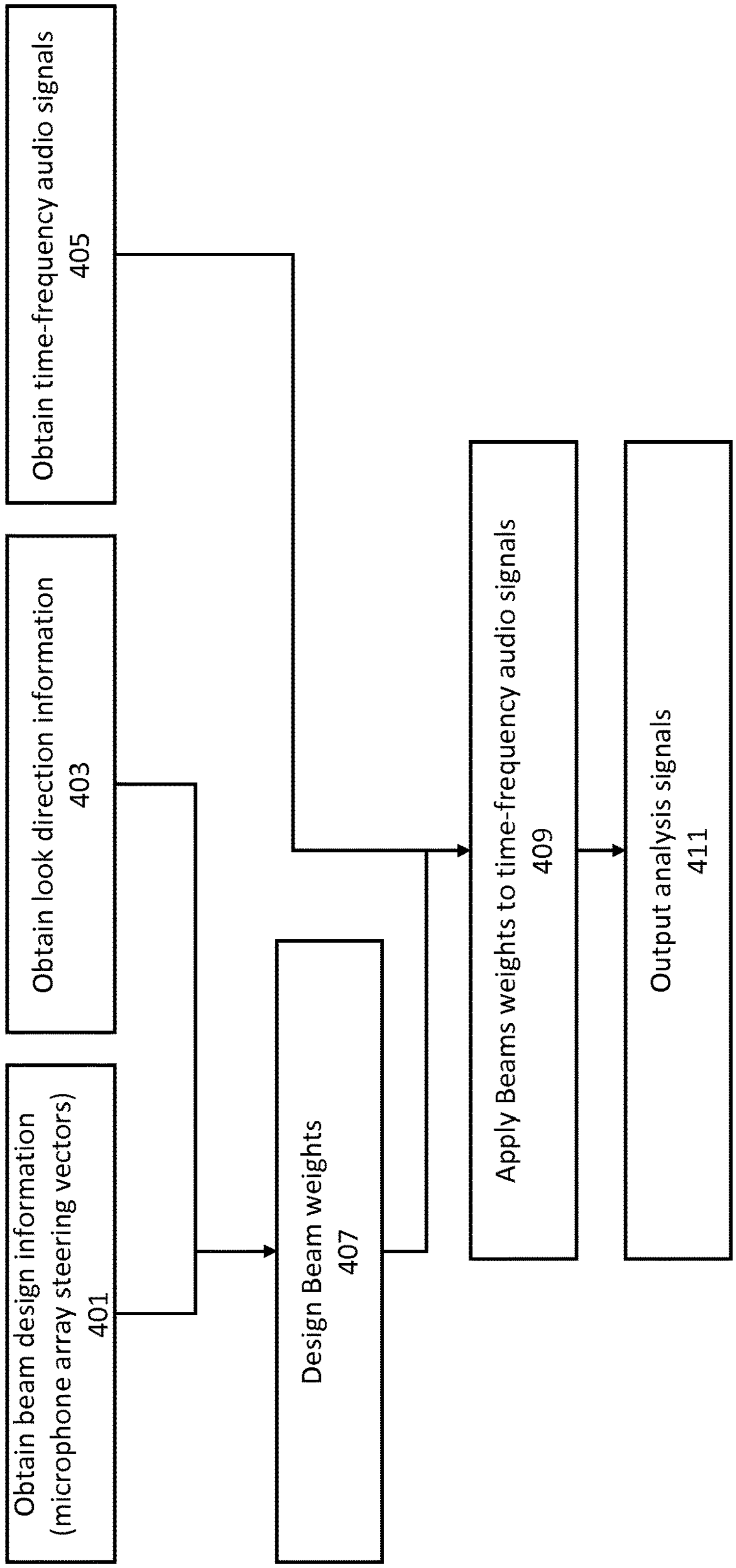
FIG. 4 shows a flow diagram of the operation of the example analysis signals generator as shown in FIG. 3 according to some embodiments.

With respect to FIG. 4 is shown a flow diagram showing the operation of the analysis signals generator 105.

The operation of obtaining beam design information (microphone array steering vectors) is shown in FIG. 4 by step 401.

The operation of obtaining look direction information is shown in FIG. 4 by step 403.

The operation of obtaining the time-frequency audio signals is shown in FIG. 4 by step 405.

Having obtained the microphone array steering vectors and the look direction information the beam weights may be designed as shown in FIG. 4 by step 407.

The beam weights can then be applied to the time-frequency audio signals to generate the beams or analysis signals as shown in FIG. 4 by step 409.

The analysis signals can then be output as shown in FIG. 4 by step 411.

Figure 5:
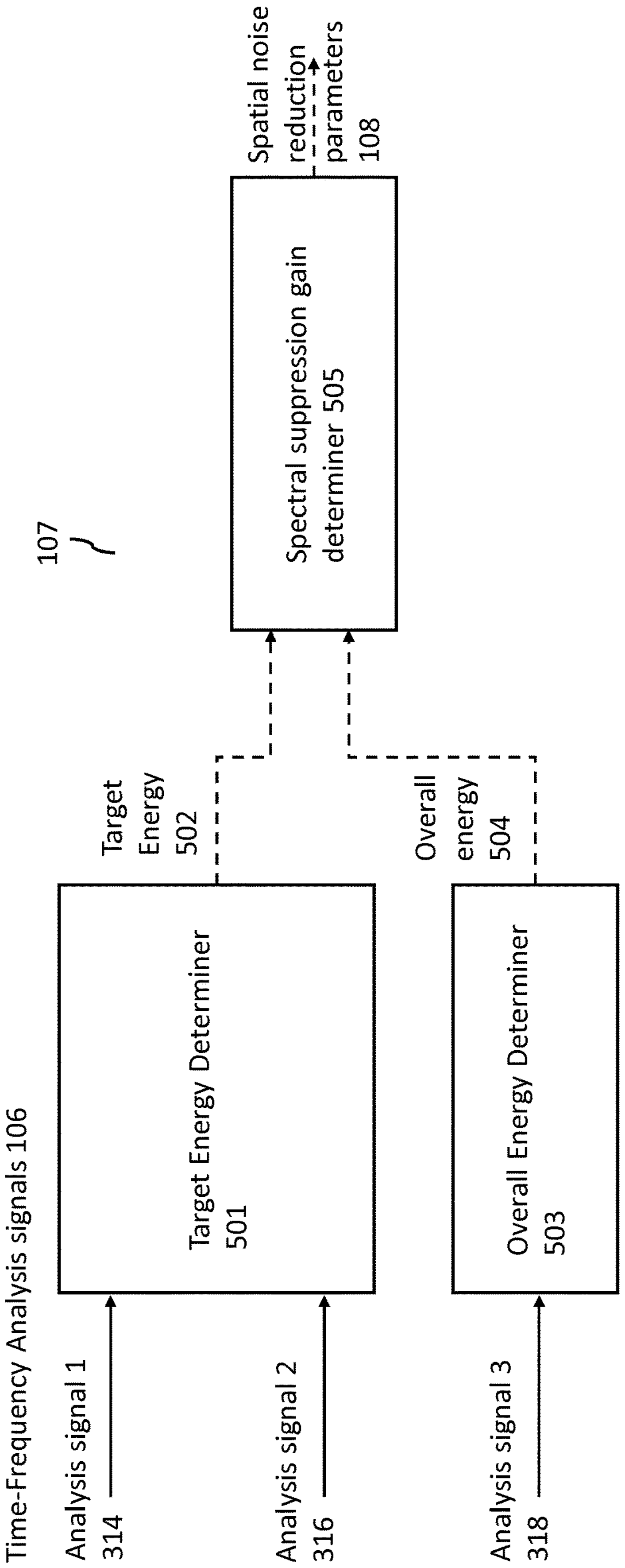
FIG. 5 shows schematically an example spatial noise reduction parameter generator as shown in FIG. 1 according to some embodiments.

With respect to FIG. 5 is shown an example of the spatial noise reduction parameter generator 107 in further detail.

The spatial noise reduction parameter generator 107 in some embodiments is configured to receive the time-frequency analysis signals 106, analysis signal 1 $S_1(b, n)$ 314, analysis signal 2 $S_2(b, n)$ 316 and analysis signal 3 $S_3(b, n)$ 318. The first two time-frequency analysis signals, analysis signal 1 $S_1(b, n)$ 314 and analysis signal 2 $S_2(b, n)$ 316 are provided to a target energy determiner 501, and the third analysis signal, analysis signal 3 $S_3(b, n)$ 318, is provided to an overall energy determiner 503.

In some embodiments the spatial noise reduction parameter generator 107 comprises a target energy determiner 501 configured to receive analysis signal 1 $S_1(b, n)$ 314 and analysis signal 2 $S_2(b, n)$ 316 and determine a target energy based on a determination of a cross-correlation value in frequency bands of the first two analysis signals by $$C(k,n)=\sum_{b=b_{low}(k)}^{b_{high}(k)} S_1(b,n)S_2^H(b,n)$$

where the superscript H denotes complex conjugate. The target energy value is generated based on C(k,n), for example, by $$E_t(k,n)=\max[0,\mathrm{real}(C(k,n))]\beta+\mathrm{abs}(C(k,n))(1-\beta)$$

where β is a value balancing between using (at generating the target energy estimate) the positive real part or the absolute value of the cross correlation. The real part estimate provides a more substantial spatial noise suppression, while the absolute value estimate provides a more modest but also more robust spatial noise suppression. β could be, for example, 0.5. The target energy $E_t(k, n)$ 502 is provided to a spectral suppression gain determiner 505.

In some embodiments the spatial noise reduction parameter generator 107 comprises an overall energy determiner 503. The overall energy determiner 503 is configured to obtain the third analysis signal, analysis signal 3 $S_3(b, n)$ 318 and determines the overall energy based on the third analysis signal by $$E_o(k,n)=\sum_{b=b_{low}(k)}^{b_{high}(k)} S_3(b,n)S_3^H(b,n)$$

The overall energy 504 $E_o(k, n)$ may then be provided to the spectral suppression gain determiner 505.

In some embodiments the target energy $E_o(k, n)$ and/or overall energy $E_t(k, n)$ may be smoothed temporally.

In some embodiments the spatial noise reduction parameter generator 107 comprises a spectral suppression gain determiner 505. The spectral suppression gain determiner 505 is configured to receive the target energy 502 $E_o(k, n)$ and overall energy 504 $E_t(k, n)$ and based on these determine the spectral suppression gains by $$g(k, n) = \max\left[g_{min}, \min\left(1, \sqrt{\frac{E_t(k, n)}{E_o(k, n)}}\right)\right]$$

where $g_{min}$ determines the maximum suppression. In some examples, the maximum suppression values are $g_{min}=0$ for the strongest suppression, and $g_{min}=0.5$ for milder suppression but for more robust processing quality. The spectral suppression gains are provided as the spatial noise reduction parameters 108.

Figure 6:
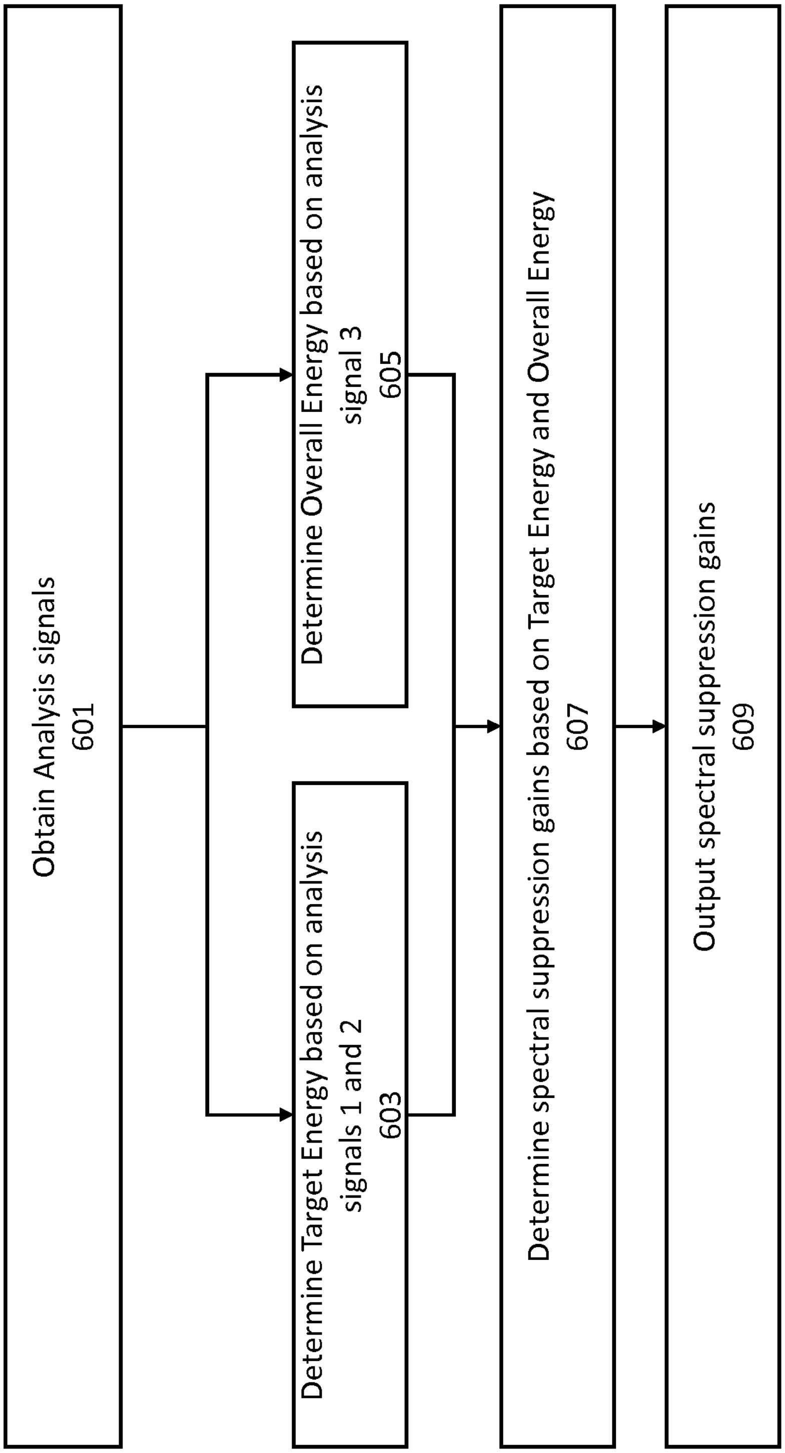
FIG. 6 shows a flow diagram of the operation of the example spatial noise reduction parameter generator as shown in FIG. 5 according to some embodiments.

With respect to FIG. 6 is shown a flow diagram of the operation of the spatial noise reduction parameter generator 107 according to some embodiments.

The operation of obtaining the analysis signals is shown in FIG. 6 by step 601.

Furthermore the determining of the target energy based on analysis signals 1 and 2 is shown in FIG. 6 by step 603.

The determining of the overall energy based on the analysis signal 3 is shown in FIG. 6 by step 605.

Having determined the overall energy and the target energy then the spectral suppression gains are determined based on the overall energy and the target energy as shown in FIG. 6 by step 607.

The outputting of the spectral suppression gains as the spectral noise reduction parameters is then shown in FIG. 6 by step 609.

In the foregoing, an example of designing the beam weights $w_1(b)$ 302, $w_2(b)$ 304, and $w_3(b)$ 306 was shown. There may be other methods to design the beam weights (i.e. to determine audio capture configurations for purpose of spatial noise suppression). The general design principle is that the beam weights for beams 1 and 2 (or first two audio capture configurations) serve the purpose of providing a substantially similar response towards a look direction (or a span of directions in the vicinity of the look direction), and otherwise to a suitable degree different responses at other directions. This may mean that both beams have the main lobe at the (or near the) look direction, but side/back lobes at different positions. It is to be noted that due to varying device shapes and microphone positionings, it is possible that either or both of these beam weights generate patterns that have the maximum at other direction than the look direction. For example, it could be that the beam 1 has unity gain towards a front direction, but a side lobe with a larger than unity gain (with some phase) towards, for example, 120 degrees. Then, beam 2 may have unity gain towards the front direction but a large attenuation and/or a significantly different phase at 120 degrees.

As the embodiments utilize the cross-correlations of signals corresponding to such beams to generate the look direction energy estimate, the large side lobe of beam 1 would in this example not cause a substantial error at the energy estimate at the look direction.

Furthermore, in some cases, for example at low frequencies where beam design is regularized (for example, by diagonal loading of the noise covariance matrix), one or both of the beams 1 and 2 may not have side lobes, but one or both of these beams may have a more omnidirectional form.

In some devices, due to the microphone positioning, it may be that the analysis beam design leads to a situation where the front beam lobe maximum is to a degree tilted from the main look direction, for example, by 10 degrees to a side. This may lead to a situation where the spatial noise suppressor, to a degree, attenuates interferers more from, for example, a left direction with respect to the look direction than from the right direction. The practical non-idealities featured by the available microphone array (of the capture device) as described above, however, generally do not prevent efficient utilization of the present embodiments. As described in the foregoing, it is only needed that the first two patterns (or audio capture configurations) have a reasonably similar response at the look direction (or directions, or span of directions) of interest, but otherwise reasonably different responses at other directions. The third set of beam weights (or audio capture configurations) then may provide the more omnidirectional response.

The energy of the third beam is compared to the estimated look direction energy to obtain the spatial noise reduction parameters. The omnidirectional energy can also be obtained from one of the first two sets of beam weights (or audio capture configurations) if one of them has a spatial response that could be considered to be substantially omnidirectional. It is to be further noted that any set of the three beam weights (or audio capture configurations) can use any subset or all available microphones.

In the foregoing, an example was shown where the energy at the look direction and a more omnidirectional energy was estimated to determine the spatial noise suppression parameters. Clearly, measures other than signal energy can also be used at the estimations and formulations, such as amplitudes or any values, indices or ratios that convey information related to the sound at the desired direction(s).

Figure 7:
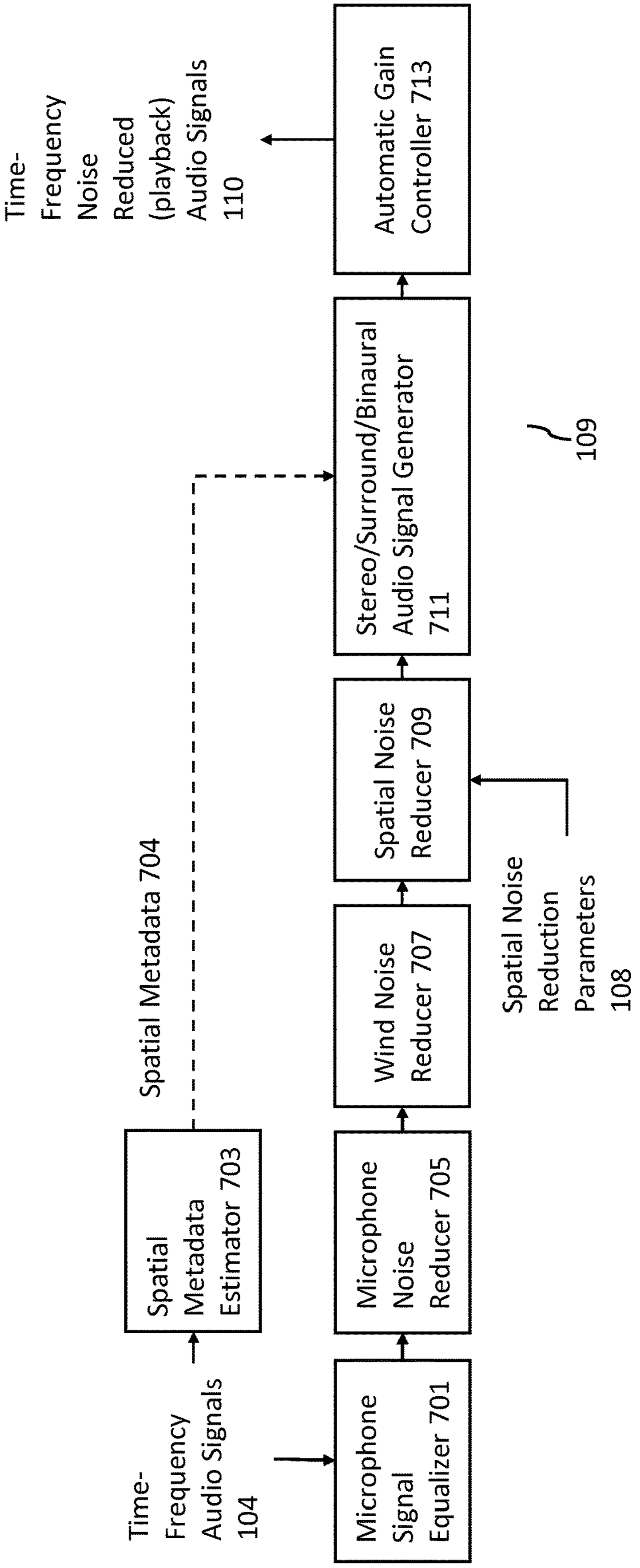
FIG. 7 shows schematically an example playback signal processor as shown in FIG. 1 according to some embodiments.

With respect to FIG. 7 is shown an example playback signal processor 109. The example playback signal processor 109 may comprise a series of processes of which the spatial noise reduction is one.

In some embodiments the playback signal processor 109 is configured to obtain the time-frequency audio signals 104.

Furthermore the playback signal processor 109 is configured to receive the spatial noise reduction parameters 108.

In some embodiments the playback signal processor 109 comprises a spatial metadata estimator 703. The spatial metadata estimator 703 is configured to receive the time-frequency audio signals 104 and determine spatial information (or parameters) related to the captured microphone signals. For example in some embodiments the parameters determined are directions and direct-to-total energy ratios in frequency bands. The spatial metadata estimator 703 is configured to perform spatial analysis on the input audio signals yielding suitable metadata 704. The purpose of the spatial metadata estimator 703 is thus to estimate spatial metadata in frequency bands. For all of the aforementioned input types, there exists known methods to generate suitable spatial metadata, for example directions and direct-to-total energy ratios (or similar parameters such as diffuseness, i.e., ambient-to-total ratios) in frequency bands. These methods are not detailed herein, however, some examples may comprise estimating delay-values between microphone pairs that maximize the inter-microphone correlation, and formulating the corresponding direction value to that delay (as described in GB Patent Application Number Application Number PCT/FI2017/050778), and formulating a ratio parameter based on the correlation value. The metadata can be of various forms and can contain spatial metadata and other metadata. A typical parameterization for the spatial metadata is one direction parameter in each frequency band DOA(k, n) and an associated direct-to-total energy ratio in each frequency band r(k, n), where k is the frequency band index and n is the temporal frame index. Determining or estimating the directions and the ratios depends on the device or implementation from which the audio signals are obtained. For example the metadata may be obtained or estimated using spatial audio capture (SPAC) using methods described in GB Patent Application Number 1619573.7 and PCT Patent Application Number PCT/FI2017/050778. In other words, in this particular context, the spatial audio parameters comprise parameters which aim to characterize the sound-field. The spatial metadata in some embodiments may contain information to render the audio signals to a spatial output, for example to a binaural output, surround loudspeaker output, crosstalk cancel stereo output, or Ambisonic output. For example in some embodiments the spatial metadata may further comprise any of the following (and/or any other suitable metadata): loudspeaker level information; inter-loudspeaker correlation information; information on the amount of spread coherent sound; information on the amount of surrounding coherent sound.

In some embodiments the parameters generated may differ from frequency band to frequency band. Thus for example in band X all of the parameters are generated and used, whereas in band Y only one of the parameters is generated, and furthermore in band Z no parameters are generated or transmitted. A practical example of this may be that for some frequency bands such as the highest band some of the parameters are not required for perceptual reasons.

As such the output is spatial metadata determined in frequency bands. The spatial metadata may involve directions and ratios in frequency bands but may also have any of the metadata types listed previously. The spatial metadata can vary over time and over frequency.

The spatial metadata estimator 703 may be configured to pass the spatial metadata 704 to the stereo/surround/binaural audio signal generator 711.

In the following example a specific ordering of processes are shown. However it would be understood that at least some of these such as the equalizer and reducers can be implemented in any suitable ordering or chaining.

In some embodiments the playback signal processor 109 comprises a microphone signal equalizer 701. The microphone signal equalizer 701 may be configured to receive the time-frequency audio signals 104 and apply gains in frequency bins to compensate for any spectral deficiencies of the microphone signals, which are typical at microphones integrated in mobile devices such as mobile phones.

In some embodiments the playback signal processor 109 comprises a microphone noise reducer 705. The microphone noise reducer 705 may be configured to monitor the noise floor of the microphones and apply gains in frequency bins to suppress that amount of sound energy at the microphone signals.

In some embodiments the playback signal processor 109 comprises a wind noise reducer 707. The wind noise reducer 707 may be configured to monitor the presence of wind at the microphone signals and apply gains in frequency bins to suppress wind noise, or to omit usage of wind-corrupted microphone channels.

In some embodiments the playback signal processor 109 comprises a spatial noise reducer 709. The spatial noise reducer 709 is configured to receive the spatial noise reduction parameters 108 and is configured to receive the signals S'(b, n, i) from the preceding blocks (which are based on the original time frequency signals S(b, n, i), and provide as output the further processed signals $$S''(b,n,i)=S'(b,n,i)g(k,n)$$

where k is the band index where bin b resides, furthermore g(k, n) is the spectral suppression gains determined by the spatial noise reduction parameter generator 107.

In some embodiments the playback signal processor 109 comprises a stereo/surround/binaural signal generator 711 which is configured to process input time-frequency signals to a spatialized output, based on the spatial metadata 704. For example, if the block generates a binaural output, the generator 711 may be configured to 1) divide the signals in frequency bands based on direct-to-total energy ratio parameters (at the spatial metadata) to direct and ambient signals, 2) process the direct part with HRTFs corresponding to the direction parameters in the spatial metadata, 3) process the ambient part with decorrelators to generate a binaural ambient signals having a binaural inter-aural cross-correlation, and 4) combine the processed direct and ambient parts. Other output formats and methods for providing these output formats known can be employed.

In some embodiments the playback signal processor 109 comprises an automatic gain controller 713 which is configured to monitor the overall energy level of the captured sounds over longer time intervals and amplify/attenuate the signals to favorable playback levels (not too silent nor distorted).

In some embodiments some of the processes may be combined. The output is the time-frequency noise-reduced (playback) audio signals 110.

Figure 8:
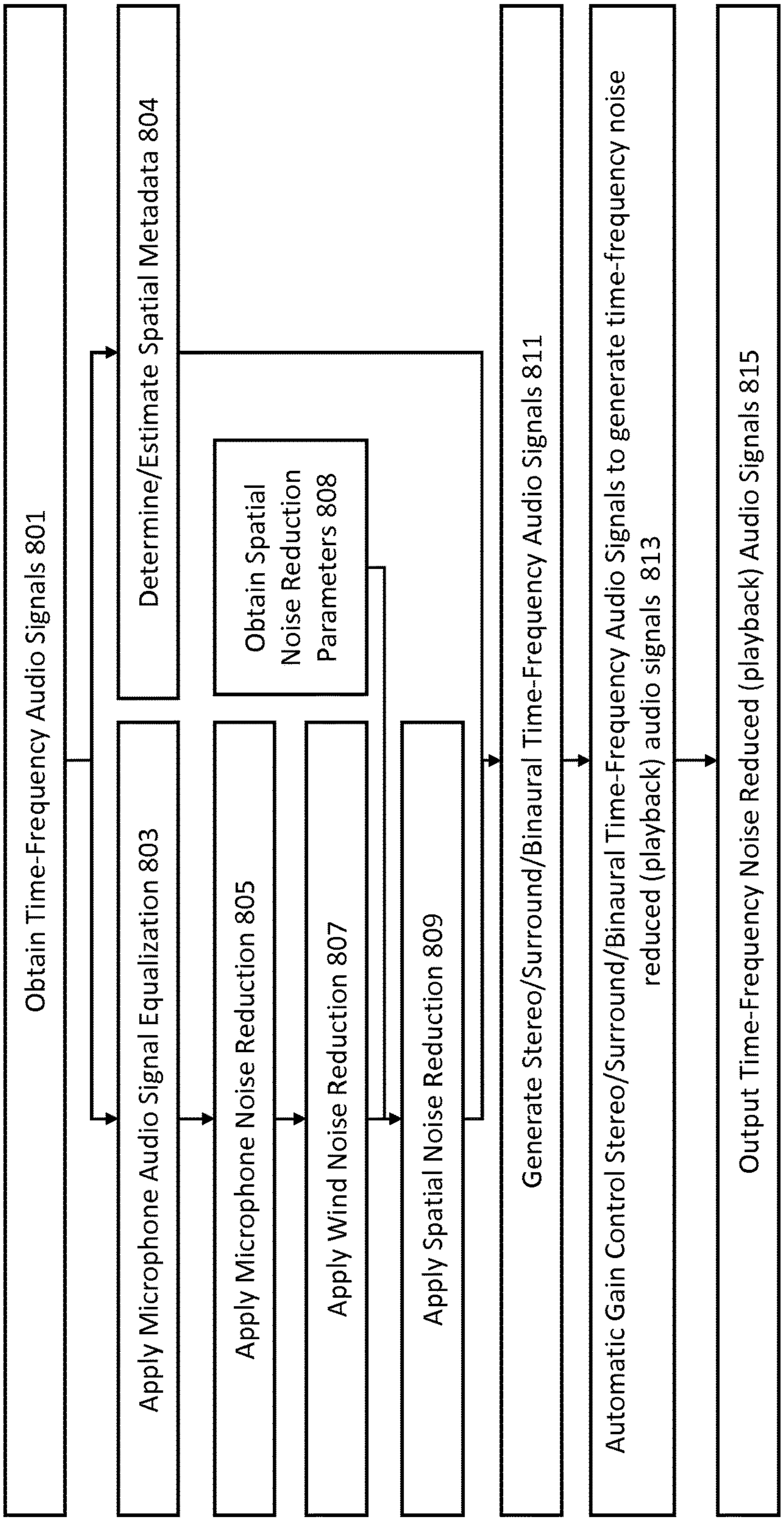
FIG. 8 shows a flow diagram of the operation of the example playback signal processor as shown in FIG. 7 according to some embodiments.

With respect to FIG. 8 is shown the operation of the example playback signal processor shown in FIG. 7.

For example as shown in FIG. 8 step 801 time-frequency audio signals are obtained.

These can then be used to determine/estimate spatial metadata (parameters) as shown in FIG. 8 by step 804.

The time-frequency audio signals can furthermore be processed by a series of optional processing operations such as microphone audio signal equalization as shown in FIG. 8 by step 803, microphone noise reduction as shown in FIG. 8 by step 805, and wind noise reduction as shown in FIG. 8 by step 807.

Furthermore the spatial noise reduction parameters can be obtained as shown in FIG. 8 by step 808.

Having obtained the spatial noise reduction parameters the spatial noise reduction operation can be applied to the (optionally processed according to steps 803, 805 and 807) time-frequency audio signal as shown in FIG. 8 by step 809.

Then the spatial noise reduction processed time-frequency audio signal can be converted into the suitable output format, such as stereo, surround or binaural audio signals as shown in FIG. 8 by step 811.

The (optional) automatic gain control can be applied to generate the time-frequency noise reduced (playback) audio signals as shown in FIG. 8 by step 813.

The time-frequency noise reduced (playback) audio signals can then be output as shown in FIG. 8 by step 815.

In the above embodiments the time-frequency analysis signals are generated from the audio signals. In some embodiments, the energetic values $E_o(k, n)$ and $E_r(k, n)$ may be obtained also without formulating intermediate analysis signals, as described in the following.

Figure 9:
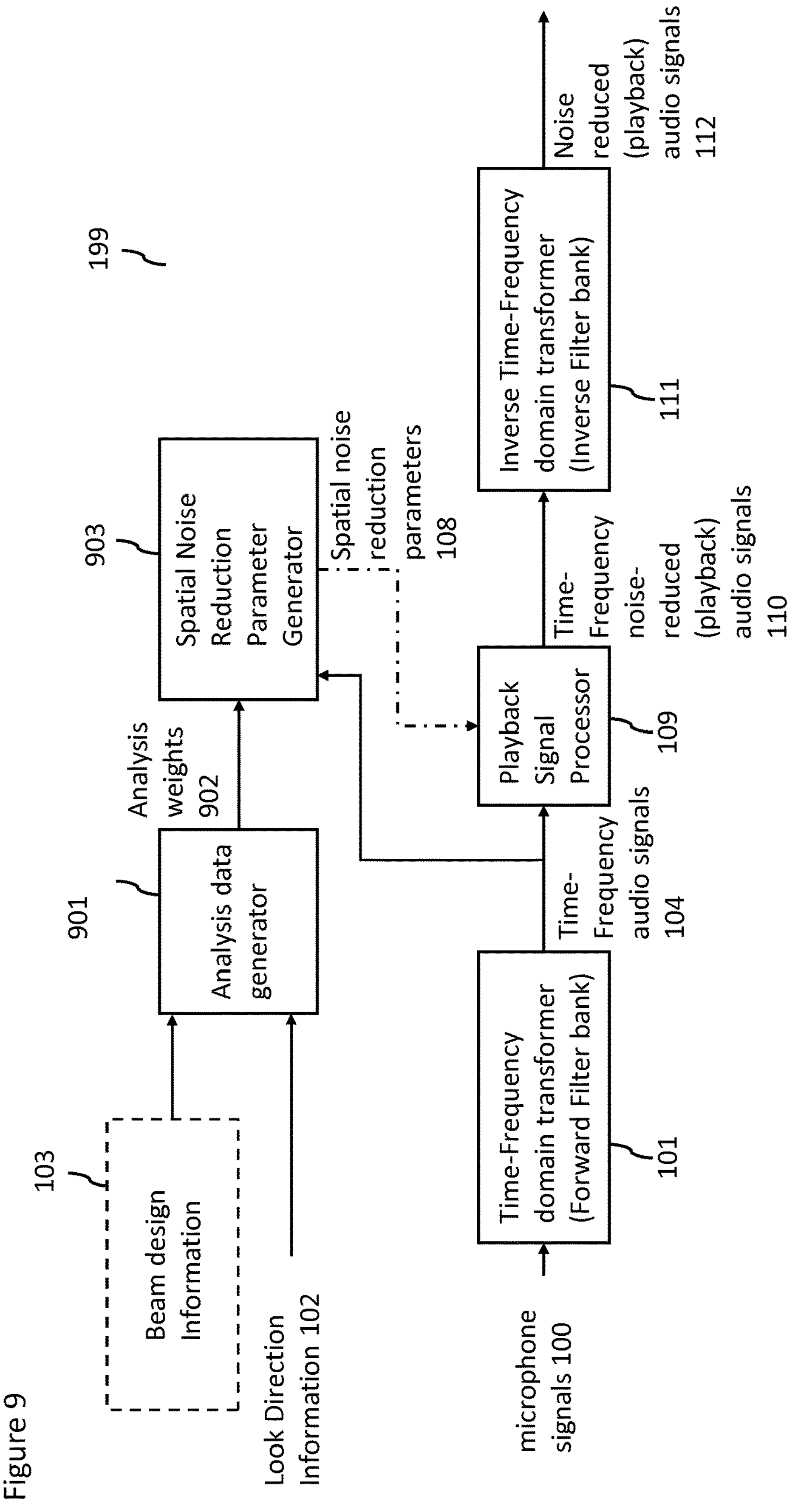
FIG. 9 shows schematically a further spatial noise suppression system of apparatus suitable for implementing some embodiments.

With respect to FIG. 9 is shown a schematic view of an example spatial noise suppressor according to some embodiments. The example spatial noise suppressor as shown in FIG. 9 is composed of several blocks that are found at FIG. 1, and such blocks can be configured in the same manner as the corresponding blocks at FIG. 1.

The example spatial noise suppressor as shown in FIG. 9 differs from the example shown in FIG. 1 in that the noise suppressor comprises an analysis data generator 901 which is configured to receive the beam design information 103 and look direction information 102. The analysis data generator 901 is then configured to output the analysis weights 902. The analysis weights 902 are then passed to a spatial noise reduction parameter generator 903.

FIG. 9 further differs in that the spatial noise reduction parameter generator 903 is configured to receive time-frequency audio signals 104 and the analysis weights 902. The spatial noise reduction parameter generator 903 in these embodiments is configured to output spatial noise reduction parameters 108, which may be of the same form as the corresponding parameters in context of FIG. 1.

Figure 10:
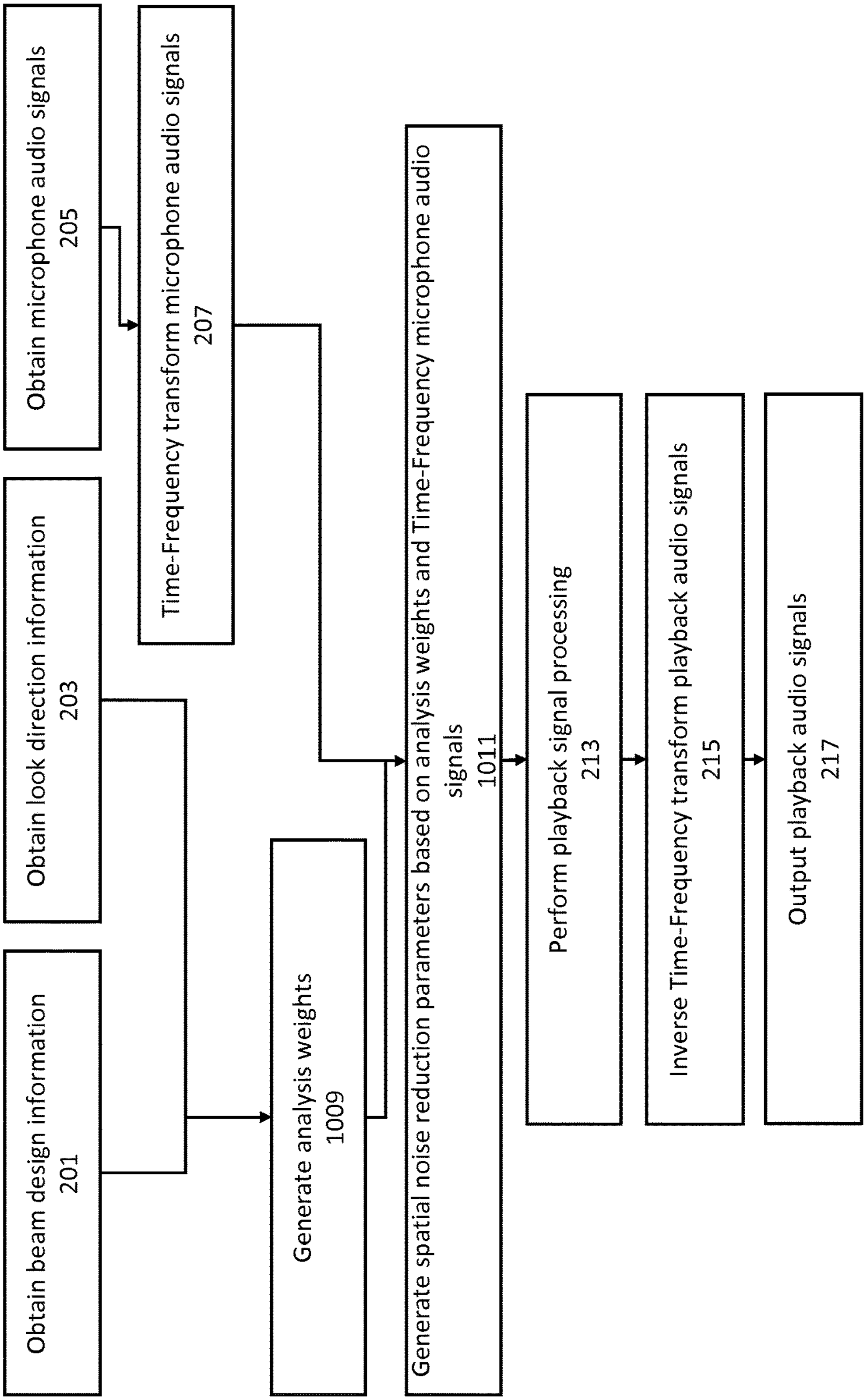
FIG. 10 shows a flow diagram of the operation of the further example apparatus as shown in FIG. 9 according to some embodiments.

With respect to FIG. 10 is shown the operation of the spatial noise suppressor as shown in FIG. 9 according to some embodiments.

The beam design information is obtained as shown in FIG. 10 by step 201.

Furthermore the look direction information is obtained as shown in FIG. 10 by step 203.

Additionally the microphone audio signals are obtained as shown in FIG. 10 by step 205.

In some embodiments the microphone audio signals are time-frequency domain transformed as shown in FIG. 10 by step 207.

Then based on the beam design information and the look direction information the analysis weights are generated as shown in FIG. 10 by step 1009.

The spatial noise reduction parameters are then generated based on the analysis weights and the Time-Frequency transform microphone audio signals as shown in FIG. 10 by step 1011.

Then playback signal processing of the time-frequency audio signals is performed based on the spatial noise reduction parameters as shown in FIG. 10 by step 213.

In some embodiments the time-frequency playback audio signals are then inverse time-frequency transformed to generate time-domain playback audio signals as shown in FIG. 10 by step 215.

The time-domain playback audio signals can then be output as shown in FIG. 10 by step 217.

Figure 11:
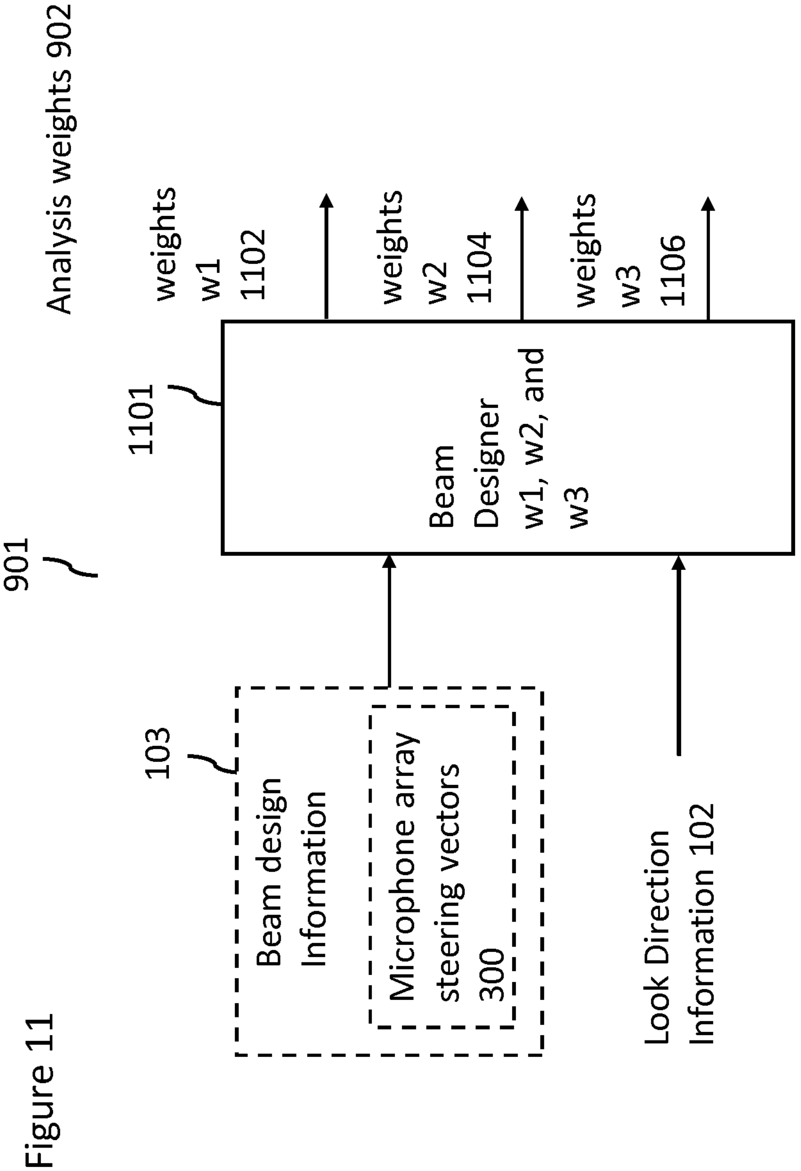
FIG. 11 shows schematically an example of an analysis data generator as shown in FIG. 9 according to some embodiments.

With respect to FIG. 11 is shown an example of the analysis data generator 901 in further detail. The example analysis data generator 901 is similar to the analysis signals generator 105 as shown in FIG. 3. However the analysis data generator 901 does not comprise all blocks of FIG. 3, and it provides the analysis weights 902 as the output.

As such analysis data generator 901 is configured to receive an input which comprises the beam design information 103, which in this example are microphone array steering vectors 300. The microphone array steering vectors 300 can in some embodiments be complex-valued column vectors v(b, DOA) as a function of frequency bin b and the direction of arrival (DOA). The entries (rows) of the steering vectors correspond to different microphone channels.

Furthermore the analysis data generator 901 is configured to receive the look direction information 102.

In some embodiments the analysis data generator 901 comprises a beam designer 1101. The beam designer 1101 is configured to receive the steering vectors 300 and the look direction information 102 and is then configured to design beamforming weights. The design can be performed by using a minimum variance distortionless response (MVDR) method in a manner as discussed above with respect to FIG. 3.

The beam weights $w_1(b)$ 1102, $w_2(b)$ 1104, and $w_3(b)$ 1106 may then be output as the analysis weights 902.

Figure 12:
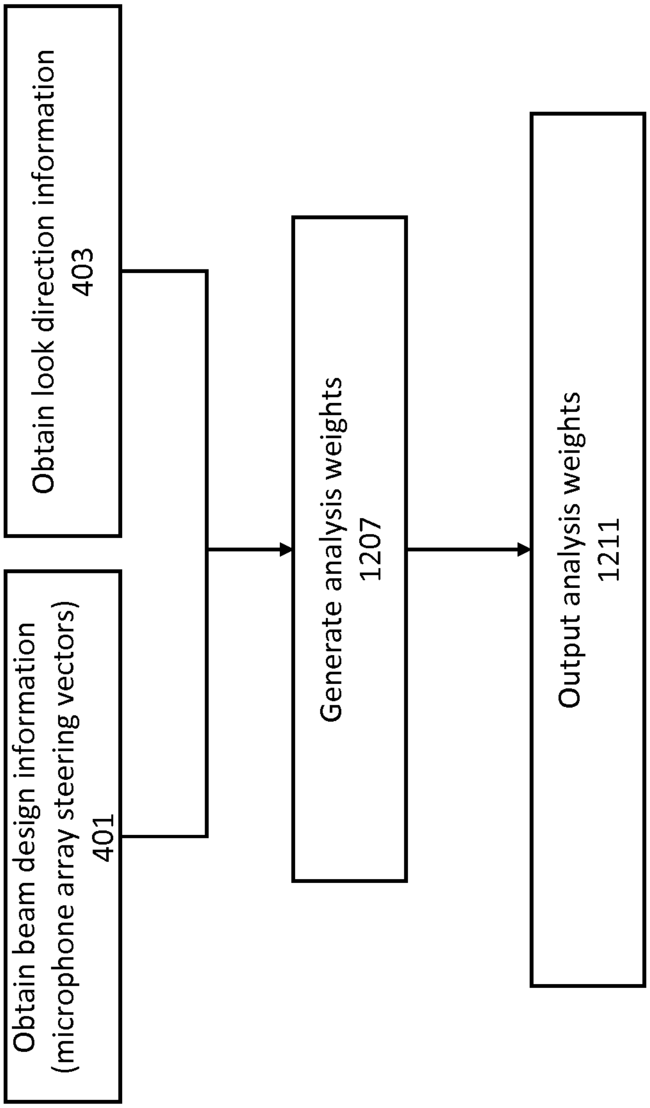
FIG. 12 shows a flow diagram of the operation of the analysis data generator as shown in FIG. 11 according to some embodiments.

With respect to FIG. 12 is shown a flow diagram showing the operation of the analysis data generator 901.

The operation of obtaining beam design information (microphone array steering vectors) is shown in FIG. 12 by step 401.

The operation of obtaining look direction information is shown in FIG. 12 by step 403.

Having obtained the microphone array steering vectors and the look direction information the analysis weights (the beam weights) may be designed as shown in FIG. 12 by step 1207.

Figure 13:
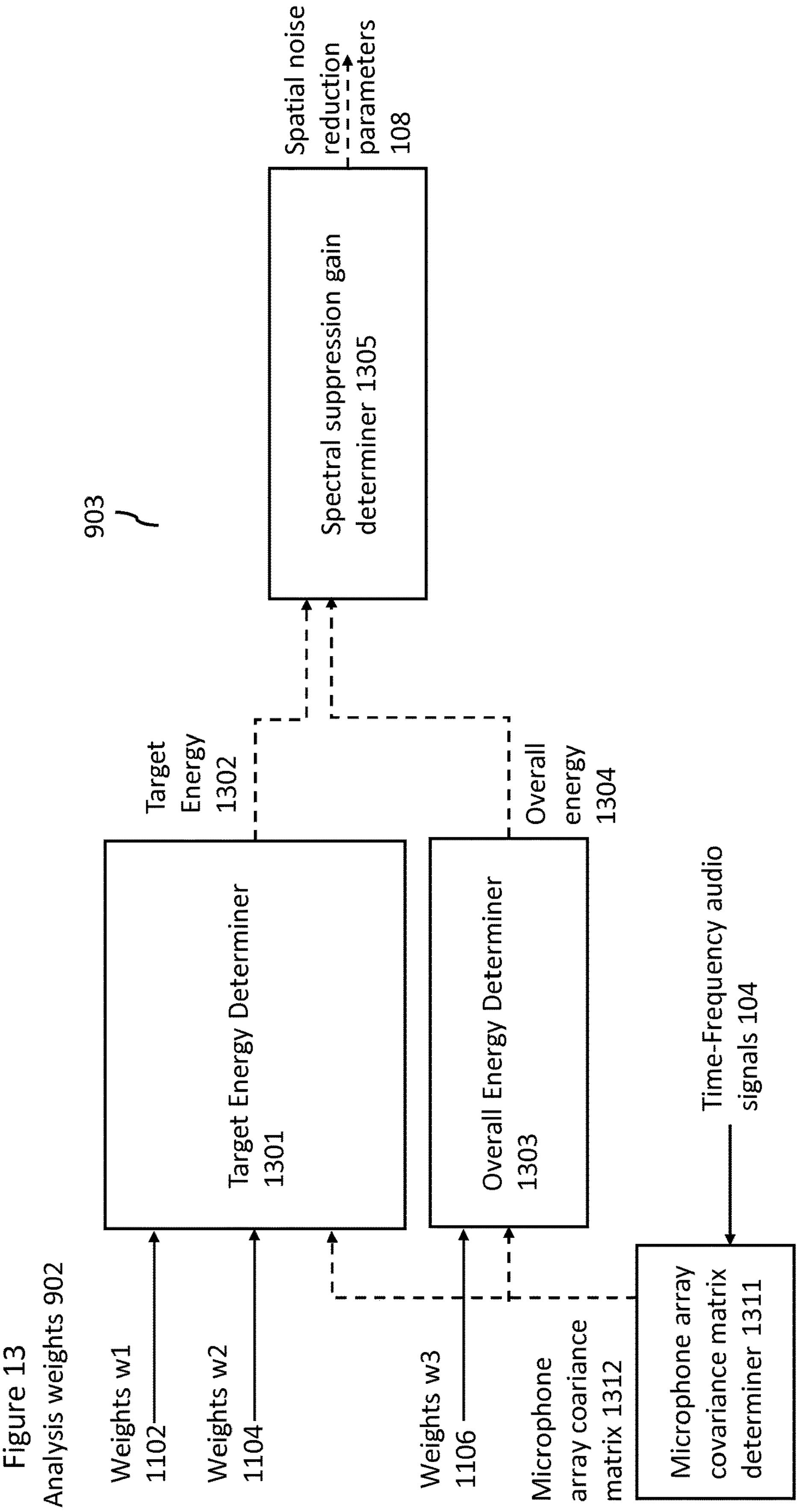
FIG. 13 shows schematically an example of a further spatial noise reduction parameter generator as shown in FIG. 9 according to some embodiments.

The analysis weights can then be output as shown in FIG. 12 by step 1211. With respect to FIG. 13 is shown an example of the spatial noise reduction parameter generator 903 such as shown in FIG. 9.

In some embodiments the spatial noise reduction parameter generator 903 comprises a microphone array covariance matrix determiner 1311. The microphone array covariance matrix determiner 1311 is configured to receive the time-frequency audio signals 104, and determine a covariance matrix in frequency bins by $$C_s(b,n)=s(b,n)s^H(b,n)$$

where s(b, n) is a column vector that contains the channels i of the time-frequency signals S(b, n, i), e.g., for three channels $$s(b,n)=\begin{bmatrix} S(b,n,1) \\ S(b,n,2) \\ S(b,n,3) \end{bmatrix}.$$

The microphone array covariance matrix determiner 1311 is configured to output the microphone array covariance matrix 1312 $C_s(b, n)$ to an overall energy determiner 1303 and a target energy determiner 1301.

In some embodiments the spatial noise reduction parameter generator 903 comprises a target energy determiner 1301. The target energy determiner 1301 is configured to receive weights $w_1$ 1102 and weights $w_2$ 1104 and the microphone array covariance matrix 1312 and determine a cross correlation value as $$C(k,n)=\sum_{b=b_{low}(k)}^{b_{high}(k)} w_1^H(b)C_s(b,n)w_2(b)$$

In a manner similar to the target energy determiner 501 as shown in FIG. 5, the target energy value is generated based on C(k, n), for example, by $$E_t(k,n)=\max[0,\mathrm{real}(C(k,n))]\beta+\mathrm{abs}(C(k,n))(1-\beta)$$

where β is a value balancing between using (at generating the target energy estimate) the positive real part or the absolute value of the cross correlation. β could be, for example, 0.5. The target energy $E_t(k, n)$ 1302 is provided to a spectral suppression gain determiner 1305.

In some embodiments the spatial noise reduction parameter generator 903 comprises an overall energy determiner 1303. The overall energy determiner 1303 is configured to receive weights $w_3$ 1106 and the microphone array covariance matrix 1312 and determines the overall energy estimate as $$E_o(k, n) = \sum_{b=b_{low}(k)}^{b_{high}(k)} w_3^H(b)C_s(b, n)w_3(b)$$

The overall target energy $E_o(k, n)$ 1304 is provided to a spectral suppression gain determiner 1305.

In some embodiments the spatial noise reduction parameter generator 903 comprises a spectral suppression gain determiner 1305 which may function in a similar manner to the spectral suppression gain determiner 505 as shown in FIG. 5.

Figure 14:
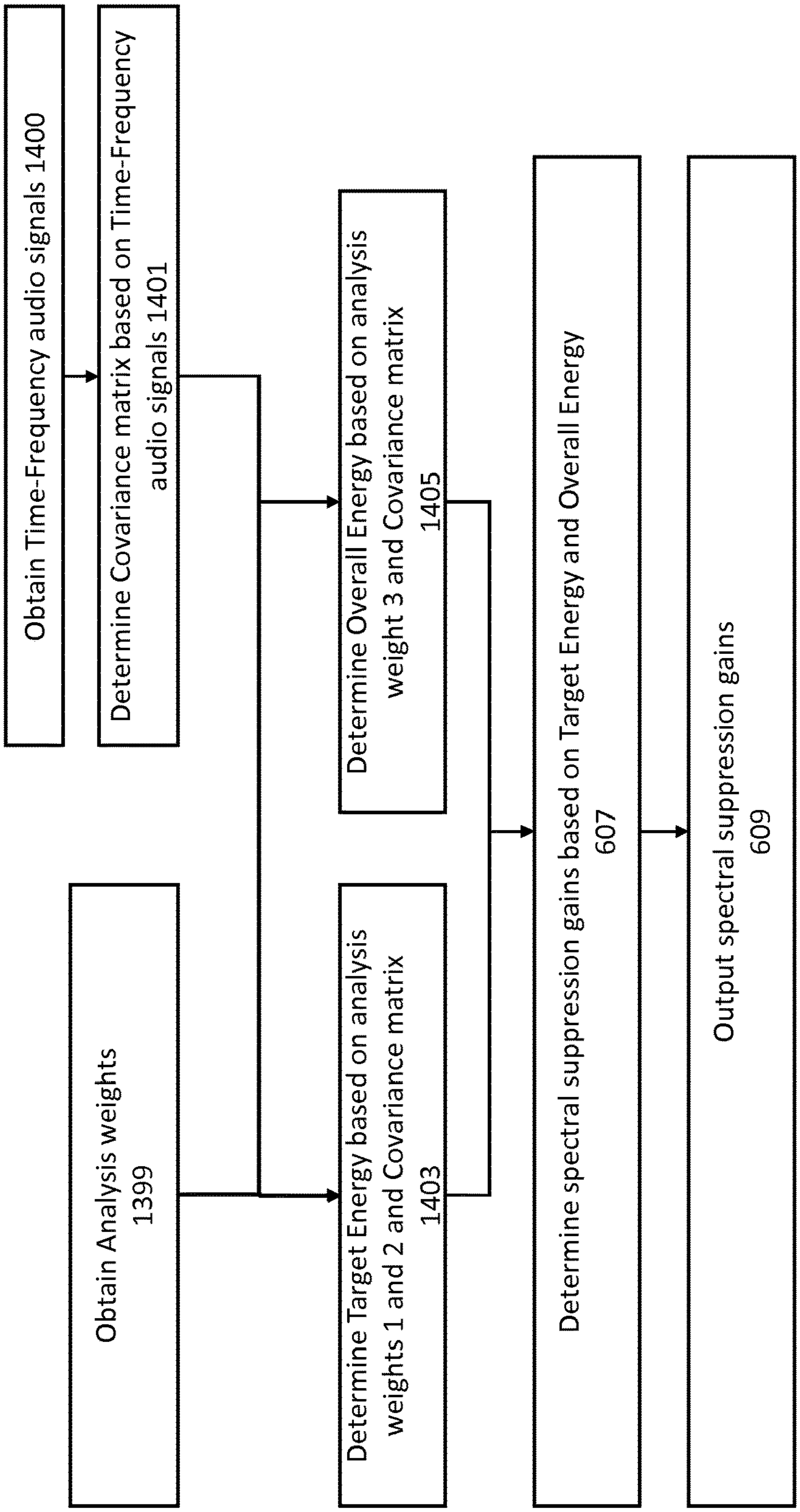
FIG. 14 shows a flow diagram of the operation of the example further spatial noise reduction parameter generator as shown in FIG. 13 according to some embodiments.

With respect to FIG. 14 is shown a flow diagram of the operation of the spatial noise reduction parameter generator 903 according to some embodiments.

The operation of obtaining the analysis weights is shown in FIG. 14 by step 1399.

The operation of obtaining the time-frequency audio signals is shown in FIG. 14 by step 1400.

The operation of determining a covariance matrix based on the time-frequency audio signals is shown in FIG. 14 by step 1401.

Furthermore the determining of the target energy based on analysis weights 1 and 2 and the covariance matrix is shown in FIG. 14 by step 1403.

The determining of the overall energy based on the analysis weight 3 and the covariance matrix is shown in FIG. 14 by step 1405.

Having determined the overall energy and the target energy then the spectral suppression gains are determined based on the overall energy and the target energy as shown in FIG. 14 by step 607.

The outputting of the spectral suppression gains as the spatial noise reduction parameters is then shown in FIG. 14 by step 609.

As shown by FIGS. 9, 11 and 13, the spatial noise suppression parameters may be formulated with the designed analysis beam weights, however, without the need to actually generate time-frequency analysis audio signals.

As the embodiments use beams in the spatial energetic estimation, a favourable microphone placement is such that has at least a suitable spacing of the microphones at the axis towards the look direction. An example mobile device showing this is shown in FIG. 15.

Figure 15:
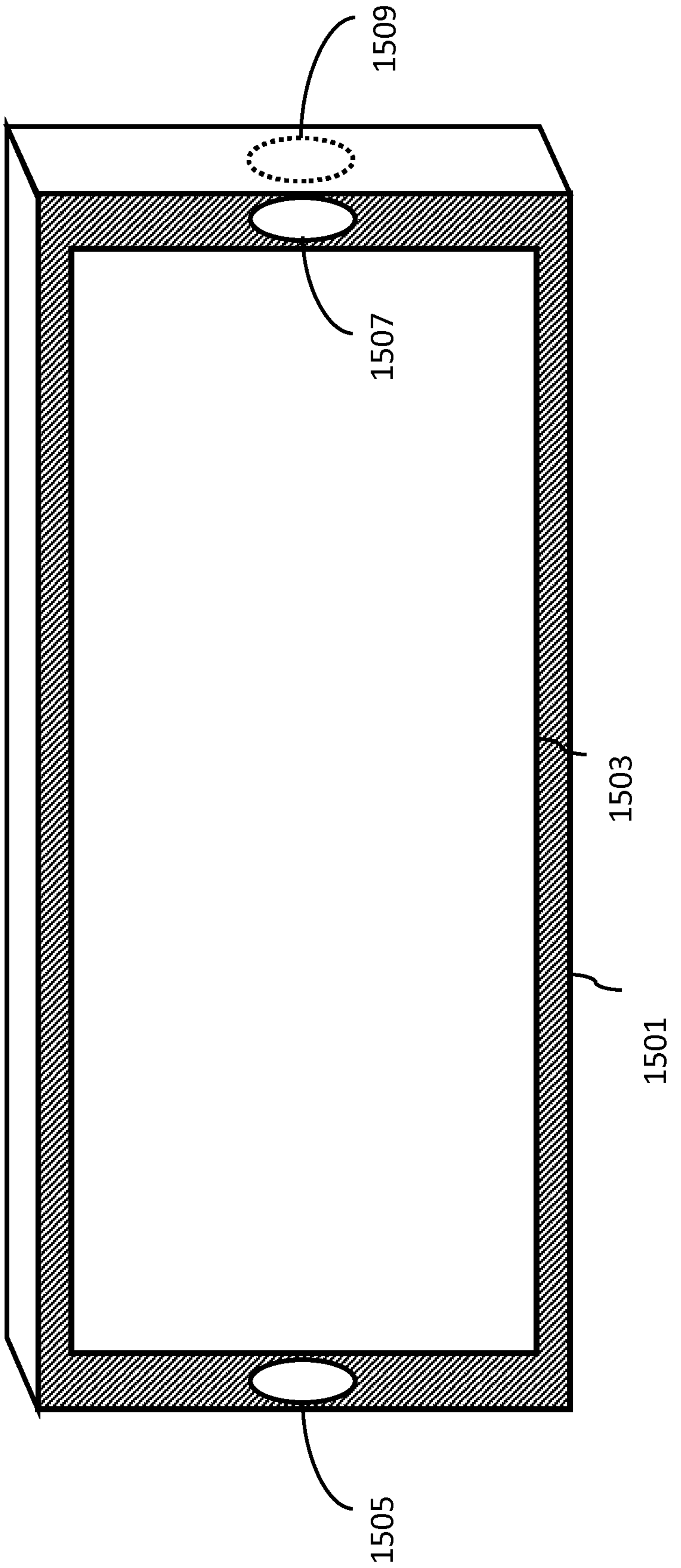
FIG. 15 shows an example microphone arrangement on a mobile device suitable for implementing the apparatus shown in previous figures.

In the example device of FIG. 15, the device 1501 is shown with a display 1503 on a front face and microphones 1505, 1507 and 1509 are placed in a favourable way along an axis when the device is operated in landscape mode. In particular, microphones 1507 and 1509 are located on the opposing sides of the device and are organized on an axis towards the camera direction (the back or rear side of the device being equipped with a camera). This enables designing well-shaped analysis patterns towards that direction. Nevertheless, in some embodiments other microphone arrangements may be employed, such as a device which comprises microphones at the edges and a third microphone near to the main camera.

In some example devices there may be only two microphones. In such a case, in order for the present embodiments to function most effectively, it is favourable that the microphone pair is substantially at the axis of the look direction. For example, considering the device of FIG. 15, the microphones 1507 and 1509 would be a microphone pair with which beam weights may be designed that enable the present embodiments to provide significant spatial noise suppression. In other words where the microphone pair is a front-back arrangement or selection, then this selection can produce acceptable results.

However even where the microphones are located at the 'wrong' axis, in other words if the device has two microphones but only at the edges (e.g. 1505 and 1507), then it is also possible implement the methods as discussed in the embodiments herein for some benefit. For example in some embodiments designing the first two analysis beam weights such that they generate cardioid beam patterns towards left and right directions. Such an example design would provide, as the result of using the present embodiments, an emphasis of the front and back directions and attenuation of the side directions, for a frequency range up until the spatial aliasing frequency determined by the spacing of the microphones 1505 and 1507.

Thus in summary the example two cardioid patterns may be generated towards right and left, as an example. This is one option (of many possibly options) which provides some benefit where the microphones are arranged at left and right edges as they cannot be configured to make only front-facing beams. The emphasis may in such an example turn to front and back directions whilst side directions are being attenuated. This is because when making a cross-correlation of cardioids pointing left and right, it may be possible to determine an energy estimate that contains mostly front and back region energies. In this example sides are attenuated. For instance, in such an example, a first cardioid has a null at 90 degrees, a second cardioid has a null at −90 degrees. Thus the cross correlation of these does not include energies from these directions 90 and −90 degrees but energies arriving from front (and rear) remain. The description or labels of front and back in this example implies that the target direction is on the same or similar axis but these respective patterns are not on the same look direction (i.e. not just to front or not just to back etc). Regardless of the issue that the beams point to 'wrong' directions, they may be considered to produce a similar response to the front direction. Thus although the term "axis" may be used to describe the patterns, for practical devices the patterns are not characterised usually by any "axis" and may be arbitrarily shaped, depending on frequency and device. They may have approximately a similar response with respect to a desired direction, and otherwise different shapes. This enables in some embodiments the cross-correlation to provide a good estimate of the sound energy at the desired direction, while in general attenuating other directions. Thus often the determined beam patterns may not have a maximum lobe at the intended look direction but at the desired look direction the responses of both patterns are similar.

The two-cardioids described above with respect to the two microphones located on the left and right of the device produce an 'extreme' or edge case embodiment. In this example the beams may be considered to have similar responses on the same or similar direction.

Figure 16:
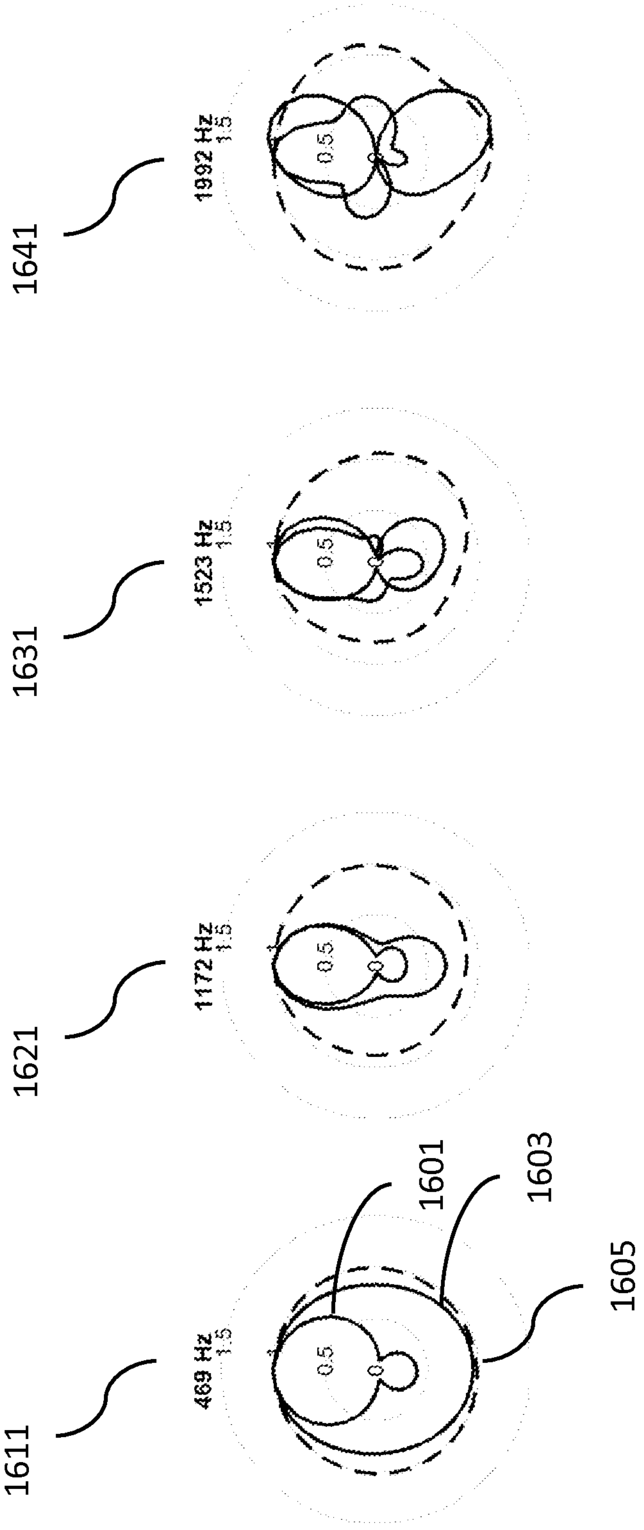
FIG. 16 shows example beam patterns based on the example microphone arrangement as shown in FIG. 15 according to some embodiments.
Figure 17:
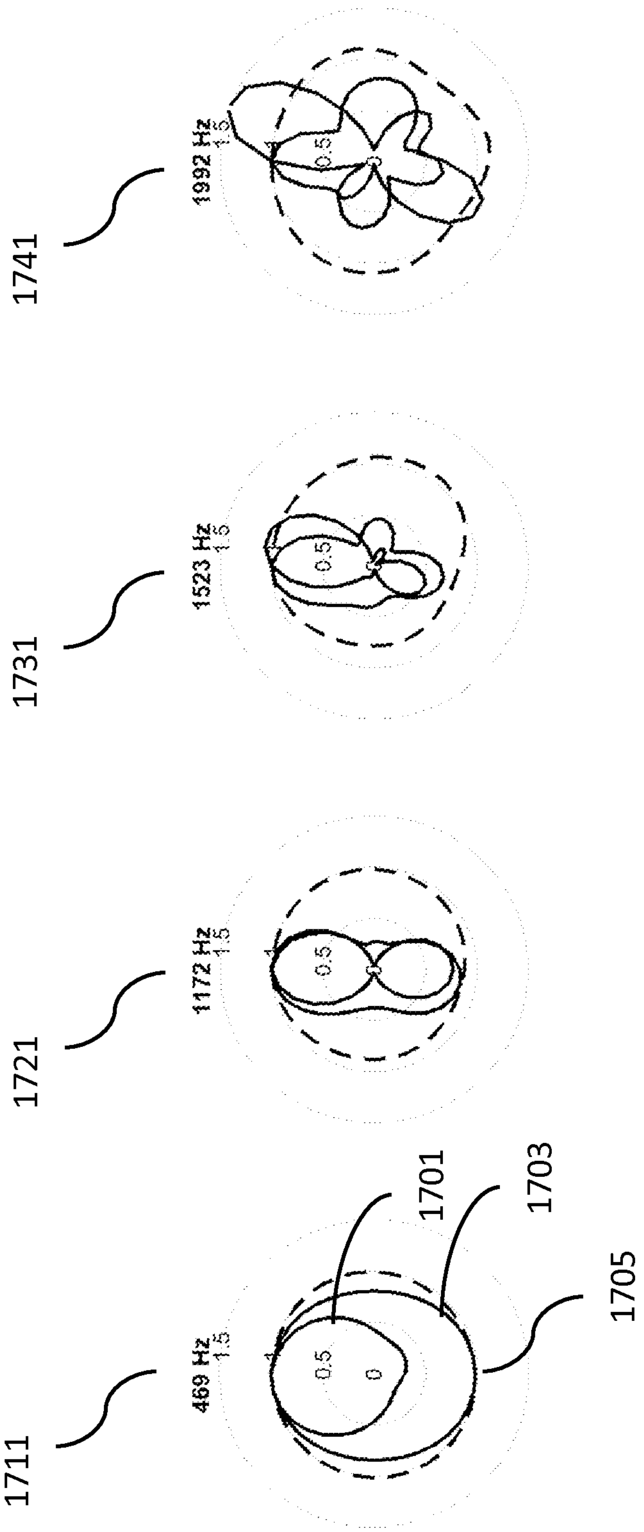
FIG. 17 shows example beam patterns based on a further example microphone arrangement according to some embodiments.

Example beam patterns that correspond to the time-frequency analysis signals 106 of FIG. 1 (and in beams weightings with respect to the embodiments shown in FIG. 9) are shown in FIGS. 16 and 17. The figures show patterns for four frequencies, a first frequency 469 Hz 1611 1711, a second frequency 1172 Hz 1621 1721, a third frequency 1523 Hz 1631 1731 and a fourth frequency 1992 Hz 1641 1741.

The dashed lines, such as 1605 and 1705, correspond to the more omnidirectional capture patterns using a microphone selection. In other words, they correspond to beam weights $w_3(b)$ configured so that only one entry of it is non-zero. The solid lines, such as 1601 1603 1701 and 1703, correspond to the patterns related to weights $w_1(b)$ and $w_2(b)$.

FIG. 16 for example shows analysis beams generated with a mobile device or phone that has three microphones: one at one edge, and two at the other edge arranged in a front-back arrangement. The arrangement is substantially similar to the example configuration as shown in FIG. 15.

FIG. 17 furthermore shows example beam patterns generated with a mobile device or phone that also has three microphones: one microphone at a left edge, one microphone at a right edge and one microphone at a rear surface of the device near the main camera position.

It is seen in FIG. 16 that when the device has a front-back microphone pair, the beam patterns remain more aligned towards the front direction when compared to the patterns of FIG. 17. However, in both cases, the analysis beams are suitable for the present embodiments. It is seen that the analysis patterns related to weights $w_1(b)$ and $w_2(b)$ have a similar response to the front direction (which is shown pointing towards the top of the figure or upwards), however their shape is generally different. At lower frequencies, one of these analysis patterns becomes fairly omnidirectional due to the regularizations at beam design and the long wavelength. It is also seen in FIGS. 16 and 17 that the more omnidirectional capture pattern related to $w_3(b)$ is not perfectly omnidirectional, but is affected by the acoustic features of the device, depending on the frequency. Even so, that analysis pattern is also suitable for the present embodiments.

Figure 18:
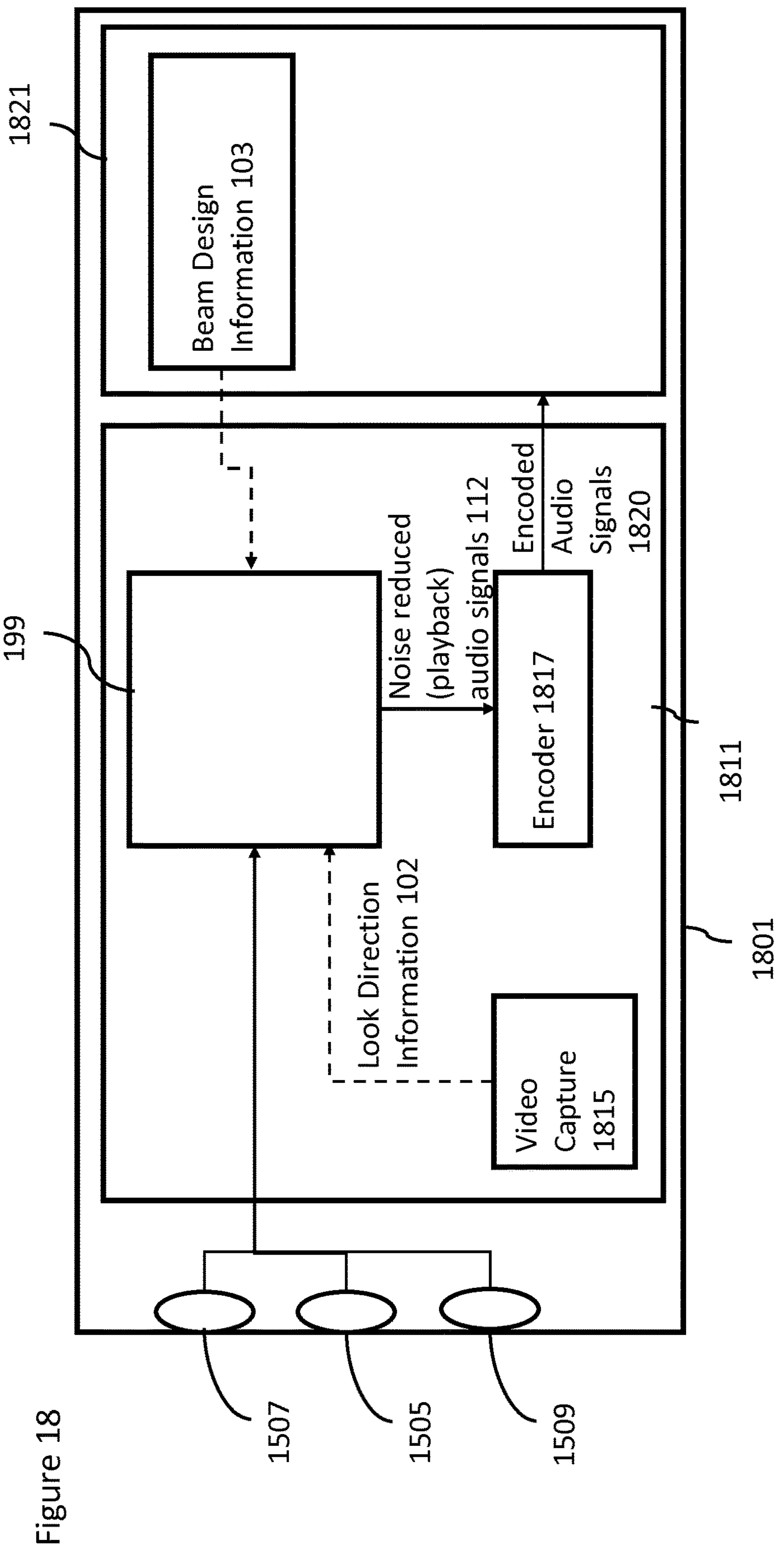
FIG. 18 shows schematically an example mobile device incorporating the spatial noise suppression system as shown in FIG. 1.

As shown in FIG. 18 is a schematic view of a suitable mobile device. The microphones 1505, 1507 and 1509 are configured to pass the microphone signals (after suitable analogue-to-digital conversions when needed) to the spatial noise suppressor 199 which may be implemented on the processor of the mobile device. In some embodiments the mobile device may further comprise video capture hardware/software configured to identify the information of which camera is being used for video capture and provides this (front or back) look direction information 102. The spatial noise suppressor 199 receives the microphone audio signals, the look direction information 102 and, from the device Storage/memory 1821, the beam design information 103. The beam design information 103 may contain measured or simulated steering vectors specific for the device, or pre-designed beams based on such steering vectors. The spatial noise suppressor 199 then generates the noise-reduced (playback) signals 112 as described in the foregoing. The noise-reduced (playback) signals 112 can be provided to an encoder 1817, which may be for example an AAC encoder. The encoded audio signals 1820 may then be stored in the device storage/memory 1821, potentially multiplexed together with the encoded video from the device camera. The encoded audio and video may then be played back at a later stage. Alternatively, the encoded audio and video signals may be transmitted/streamed during the capture time and played back by some other device.

Figure 19:
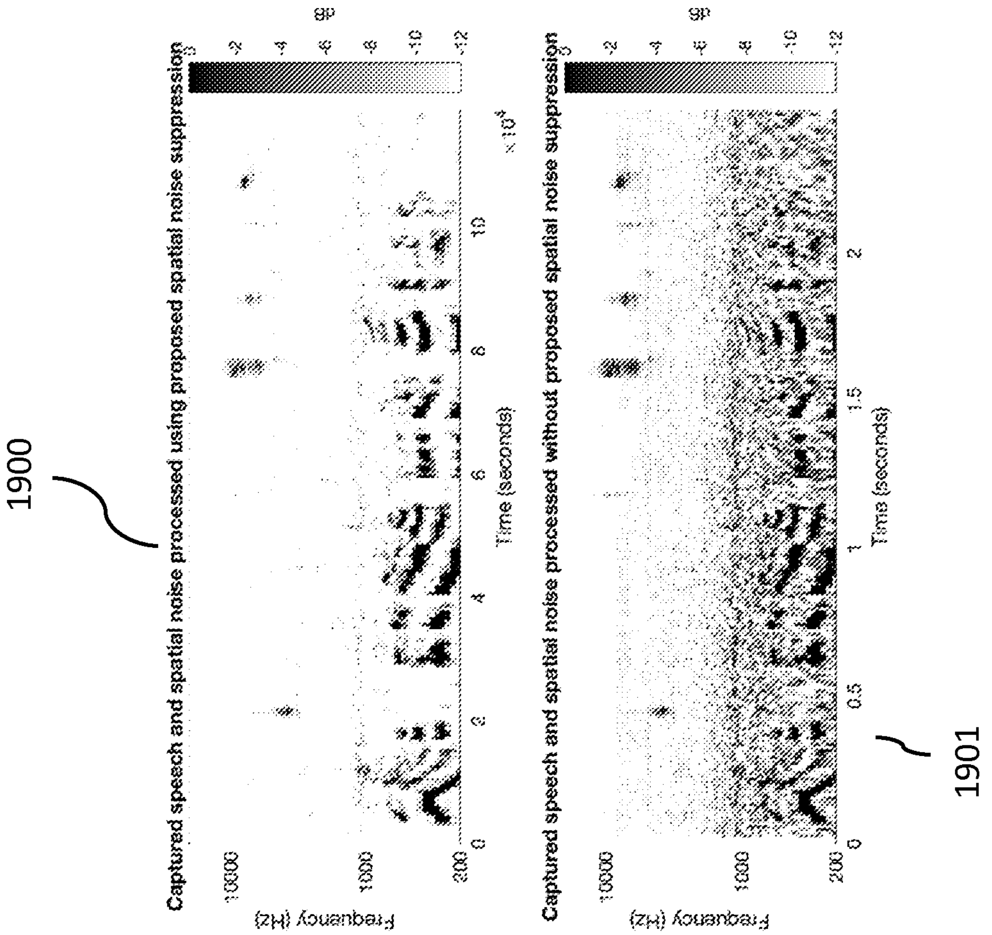
FIG. 19 shows example graphs showing simulations demonstrating the improvements within apparatus implementing some embodiments.

FIG. 19 shows an example output of a mobile phone shaped capture device in landscape mode having three microphones near to the left edge, and one microphone near to the right edge. The captured audio scene consists of a talker at the front, and incoherent pink noise reproduced at 36 even horizontal directions and a further pink noise interferer at 90 degrees left. The top of FIG. 19 1900 shows the result of capture processing using the embodiments as described herein. The bottom of FIG. 19 1901 is the capture processing otherwise in the same way, except that the spatial noise suppression gains are not applied to the signals. From FIG. 19, when implementing embodiments as described above a significant reduction of the spatial noise can be seen while the talker sound is preserved.

The term audio signal as used herein may refer to a single audio channel, or an audio signal with two or more channels.

Figure 20:
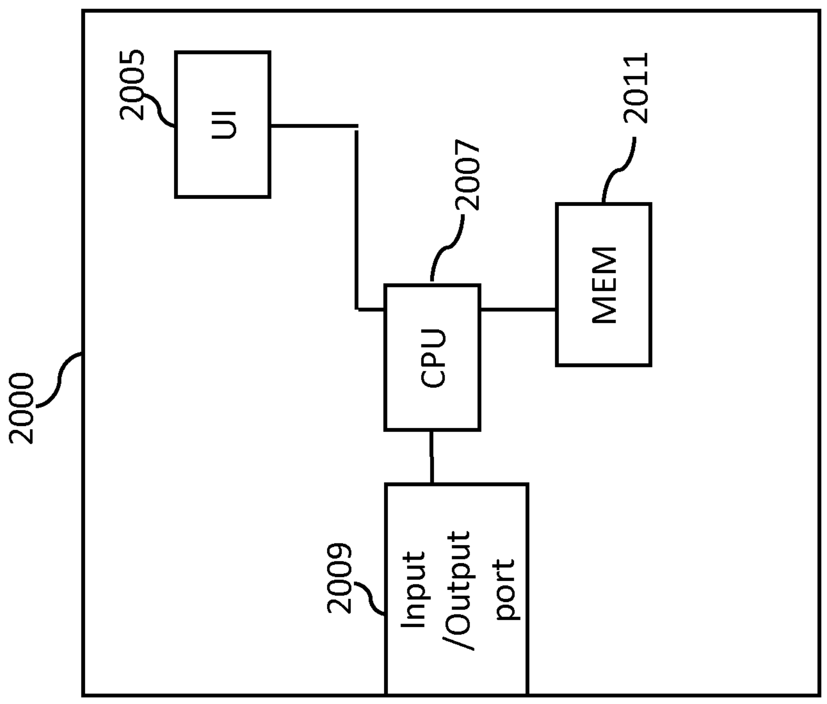
FIG. 20 shows an example device suitable for implementing the apparatus shown in previous figures.

With respect to FIG. 20 an example electronic device which may be used as any of the apparatus parts of the system as described above. The device may be any suitable electronics device or apparatus. For example in some embodiments the device 2000 is a mobile device, user equipment, tablet computer, computer, audio playback apparatus, etc.

In some embodiments the device 2000 comprises at least one processor or central processing unit 2007. The processor 2007 can be configured to execute various program codes such as the methods such as described herein.

In some embodiments the device 2000 comprises a memory 2011. In some embodiments the at least one processor 2007 is coupled to the memory 2011. The memory 2011 can be any suitable storage means. In some embodiments the memory 2011 comprises a program code section for storing program codes implementable upon the processor 2007. Furthermore in some embodiments the memory 2011 can further comprise a stored data section for storing data, for example data that has been processed or to be processed in accordance with the embodiments as described herein. The implemented program code stored within the program code section and the data stored within the stored data section can be retrieved by the processor 2007 whenever needed via the memory-processor coupling.

In some embodiments the device 2000 comprises a user interface 2005. The user interface 2005 can be coupled in some embodiments to the processor 2007. In some embodiments the processor 2007 can control the operation of the user interface 2005 and receive inputs from the user interface 2005. In some embodiments the user interface 2005 can enable a user to input commands to the device 2000, for example via a keypad. In some embodiments the user interface 2005 can enable the user to obtain information from the device 2000. For example the user interface 2005 may comprise a display configured to display information from the device 2000 to the user. The user interface 2005 can in some embodiments comprise a touch screen or touch interface capable of both enabling information to be entered to the device 2000 and further displaying information to the user of the device 2000. In some embodiments the user interface 2005 may be the user interface for communicating.

In some embodiments the device 2000 comprises an input/output port 2009. The input/output port 2009 in some embodiments comprises a transceiver. The transceiver in such embodiments can be coupled to the processor 2007 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable radio access architecture based on long term evolution advanced (LTE Advanced, LTE-A) or new radio (NR)

(or can be referred to as 5G), universal mobile telecommunications system (UMTS) radio access network (UTRAN or E-UTRAN), long term evolution (LTE, the same as E-UTRA), 2G networks (legacy network technology), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS), any other suitable option and/or any combination thereof.

The transceiver input/output port 2009 may be configured to receive the signals.

The input/output port 2009 may be coupled to headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
- at least one processor; and
- at least one memory storing instructions that, when executed with the at least one processor, cause the apparatus at least to:
  - obtain at least two microphone audio signals;
  - determine audio data comprising different directivity configurations that are able to capture sound from substantially a same or similar direction;
  - determine at least one value related to sound arriving from at least the same or similar direction based on the audio data;
  - determine further audio data comprising at least one configuration which provides a more omnidirectional directivity configuration than the audio data;
  - determine at least one value related to sound based on the further audio data; and
  - determine at least one spatial noise suppression parameter based on the at least one value related to sound arriving from the same or similar direction and the at least one value related to sound based on the further audio data, wherein the at least one spatial noise suppression parameter is configured to be applied to the at least two microphone audio signals in a generation of at least one playback audio signal.

2. The apparatus as claimed in claim 1, wherein the instructions, when executed with the at least one processor, cause the apparatus to determine at least one first audio signal combination or selection from the at least two microphone audio signals and at least one second audio signal combination or selection from the at least two microphone audio signals.

3. The apparatus as claimed in claim 2, wherein the instructions, when executed with the at least one processor, cause the apparatus to process at least one of:
- the at least one first audio signal combination or selection; or
- the at least one second audio signal combination or selection.

4. The apparatus as claimed in claim 3, wherein the instructions, when executed with the at least one processor, cause the apparatus to at least one of:
- select and equalize the at least one first audio signal combination or selection;
- select and equalize the at least one second audio signal combination or selection;

weight and combine the at least one first audio signal combination or selection; or weight and combine the at least one second audio signal combination or selection.

5. The apparatus as claimed in claim 2, wherein the instructions, when executed with the at least one processor, cause the apparatus to determine the at least one value related to an amount of sound arriving from the same or similar direction based on the at least one first audio signal combination or selection and at least one second audio signal combination or selection.

6. The apparatus as claimed in claim 2, wherein the instructions, when executed with the at least one processor, cause the apparatus to determine at least one further audio signal combination or selection from the at least two microphone audio signals, the at least one further audio signal combination or selection providing more omnidirectional audio signal capture than at least one of the at least one first audio signal combination or selection from the at least two microphone audio signals and the at least one second audio signal combination or selection.

7. The apparatus as claimed in claim 6, wherein the instructions, when executed with the at least one processor, cause the apparatus to determine at least one value related to sound based on further audio data which further causes the apparatus to determine at least one value related to sound based on the at least one further audio signal combination or selection.

8. The apparatus as claimed in claim 2, wherein the at least first audio signal combination or selection and the at least one second audio signal combination or selection represents spatially selective audio signals steered with respect to the same or similar direction but having different spatial configurations.

9. The apparatus as claimed in claim 2, wherein the instructions, when executed with the at least one processor, cause the apparatus to determine the at least one first audio signal combination or selection for at least two frequency bands and the at least one second audio signal combination or selection for the at least two frequency bands, the instructions, when executed with the at least one processor, cause the apparatus to determine at least one target value based on the at least one first audio signal combination and at least one second audio signal combination for the at least two frequency bands, the instructions, when executed with the at least one processor, cause the apparatus to determine at least one further audio signal combination or selection for the at least two frequency bands, the instructions, when executed with the at least one processor, cause the apparatus to determine the at least one overall value based on the at least one further audio signal combination or selection for the at least two frequency bands, and the instructions, when executed with the at least one processor, cause the apparatus to determine the at least one spatial noise suppression parameter based on the at least one target value and the at least one overall value for the at least two frequency bands.

10. The apparatus as claimed in claim 5, wherein the instructions, when executed with the at least one processor, cause the apparatus to determine at least one of:

at least one target energy value;

at least one target normalised amplitude value; or at least one target prominence value.

11. The apparatus as claimed in claim 7, wherein the instructions, when executed with the at least one processor, cause the apparatus to determine at least one of:

at least one overall energy value;

at least one overall normalised amplitude value; or at least one overall prominence value, such that the apparatus is caused to determine the at least one spatial noise suppression parameter based on the at least one value related to sound arriving from the same or similar direction and the at least one value related to the sound and cause the apparatus to determine the at least one spatial noise suppression parameter based on a ratio between the at least one value related to sound arriving from the same or similar direction and the at least one value related to the sound.

12. The apparatus as claimed in claim 6, wherein the at least one second audio signal combination or selection is the at least one further audio signal combination or selection.

13. The apparatus as claimed in claim 8, wherein the different spatial configurations comprise one of:

different directivity patterns;

different beam patterns; or different spatial selectivity.

14. The apparatus as claimed in claim 1, wherein the instructions, when executed with the at least one processor, cause the apparatus to determine at least one first set of weights and at least one second set of weights, such that when the at least one first set of weights and the at least one second set of weights are applied to the microphone audio signals, a produced signal combination or selection represents sound from substantially a same or similar direction.

15. The apparatus as claimed in claim 14, wherein the instructions, when executed with the at least one processor, cause the apparatus to determine the at least one value related to sound arriving from the same or similar direction based on the at least one first set of weights, the at least one second set of weights, and at least one determined covariance matrix based on the least two microphone audio signals.

16. The apparatus as claimed in claim 14, wherein the instructions, when executed with the at least one processor, cause the apparatus to determine at least one third set of weights, such that when applied to the microphone audio signals a produced signal combination or selection represents sound which provides a more omnidirectional audio signal than the produced signal when at least one of the at least one first set of weights or the at least one second set of weights are applied to the microphone audio signals.

17. The apparatus as claimed in claim 15, wherein the instructions, when executed with the at least one processor, cause the apparatus to determine the at least one value related to sound based on at least one third set of weights and at least one determined covariance matrix based on the least two microphone audio signals.

18. The apparatus as claimed in claim 15, wherein the instructions, when executed with the at least one processor, cause the apparatus to:

time-frequency domain transform the at least two microphone audio signals; and determine the at least one covariance matrix based on the time-frequency domain transform of the at least two microphone audio signals.

19. The apparatus as claimed in claim 1, wherein the instructions, when executed with the at least one processor, cause the apparatus to:

spatially noise suppression process the at least two microphone audio signals based on the at least one spatial noise suppression parameter.

20. The apparatus as claimed in claim 19, wherein the instructions, when executed with the at least one processor, cause the apparatus to at least one of:

apply a microphone signal equalization to the at least two microphone audio signals;

apply a microphone noise reduction to the at least two microphone audio signals;

apply a wind noise reduction to the at least two microphone audio signals;

apply an automatic gain control to the at least two microphone audio signals; or generate at least two output audio signals based on the spatially noise suppression process of the at least two microphone audio signals.

21. A method comprising:

obtaining at least two microphone audio signals;

determining audio data comprising different directivity configurations that are able to capture sound from substantially a same or similar direction;

determining at least one value related to sound arriving from at least the same or similar direction based on the audio data;

determining further audio data comprising at least one configuration which provides a more omnidirectional directivity configuration than the audio data;

determining at least one value related to sound based on the further audio data; and determining at least one spatial noise suppression parameter based on the at least one value related to sound arriving from the same or similar direction and the at least one value related to sound based on the further audio data, wherein the at least one spatial noise suppression parameter is configured to be applied to the at least two microphone audio signals in a generation of at least one playback audio signal.

22. A non-transitory program storage device readable with an apparatus, tangibly embodying a program of instructions executable with the apparatus for performing the operations of claim 21.

* * * * *